(12) United States Patent
Chehrazi et al.

(10) Patent No.: US 6,282,556 B1
(45) Date of Patent: Aug. 28, 2001

(54) HIGH PERFORMANCE PIPELINED DATA PATH FOR A MEDIA PROCESSOR

(75) Inventors: Farzad Chehrazi, San Jose; Vojin G. Oklobdzija, Berkeley, both of CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/451,669

(22) Filed: Nov. 30, 1999

Related U.S. Application Data

(63) Continuation-in-part of application No. 09/415,485, filed on Oct. 8, 1999.

(51) Int. Cl.[7] .................................................. G06F 7/52

(52) U.S. Cl. ......................... 708/521; 708/201; 708/620

(58) Field of Search ................................... 708/521, 523, 708/201, 620

(56) References Cited

U.S. PATENT DOCUMENTS

| | | | |
|---|---|---|---|
| 5,005,150 | * 4/1991 | Dent et al. .............................. | 708/521 |
| 5,880,979 | * 3/1999 | Mennemeier et al. ................ | 708/201 |
| 5,974,435 | * 10/1999 | Abbott .................................. | 708/523 |
| 6,035,316 | * 3/2000 | Peleg et al. ........................... | 708/523 |
| 6,036,350 | * 3/2000 | Mennemeier et al. ................ | 708/201 |

OTHER PUBLICATIONS

A. Farooqui et al.; "Multiplexer Based Adder for Media Signal Processing"; LSI System Laboratory, Sony US Research Laboratories, San Jose, CA; Integration Corp., Berkeley, CA.

A. Farooqui et al.; "VLSI Implementation of Early Branch Prediction Circuits for High Performance Computing"; Dept. of Electrical and Computer Eng., University of CA, Davis, CA; Integration Berkeley, CA; 1999 IEEE.

* cited by examiner

Primary Examiner—David H. Malzahn
(74) Attorney, Agent, or Firm—Wagner Murabito & Hao LLP

(57) ABSTRACT

A pipelined data path architecture for use, in one embodiment, in a multimedia processor. The data path architecture requires a maximum of two execution pipestages to perform all instructions including wide data format multiply instructions and specially adapted multimedia instructions, such as the sum of absolute differences (SABD) instruction and other multiply with add (MADD) instructions. The data path architecture includes two wide data format input registers that feed four partitioned 32×32 multiplier circuits. Within two pipestages, the multiply circuit can perform one 128×128 multiply operation, four 32×32 multiply operations, eight 16×16 multiply operations or sixteen 8×8 multiply operations in parallel. The multiply circuit contains a compressor tree which generates a 256-bit sum and a 256-bit carry vector. These vectors are supplied to four 64-bit carry propagate adder circuits which generate the multiply results. When the data path architecture is performing specially adapted multimedia instructions the input registers are supplied to a pipelined logic unit containing adders, subtractors, shifters, average/round/absolute value circuits, and other logic operation circuits, compressor circuits and multiplexers. The output of the pipelined logic unit is then fed to the four 64-bit carry propagate adder circuits. In this way, the adder circuits of the multiply operation can be effectively used to also process the specially adapted multimedia instructions thereby saving IC area. Multiply circuitry is disabled to save power when the data path architecture is not processing a multiplication instruction.

20 Claims, 25 Drawing Sheets

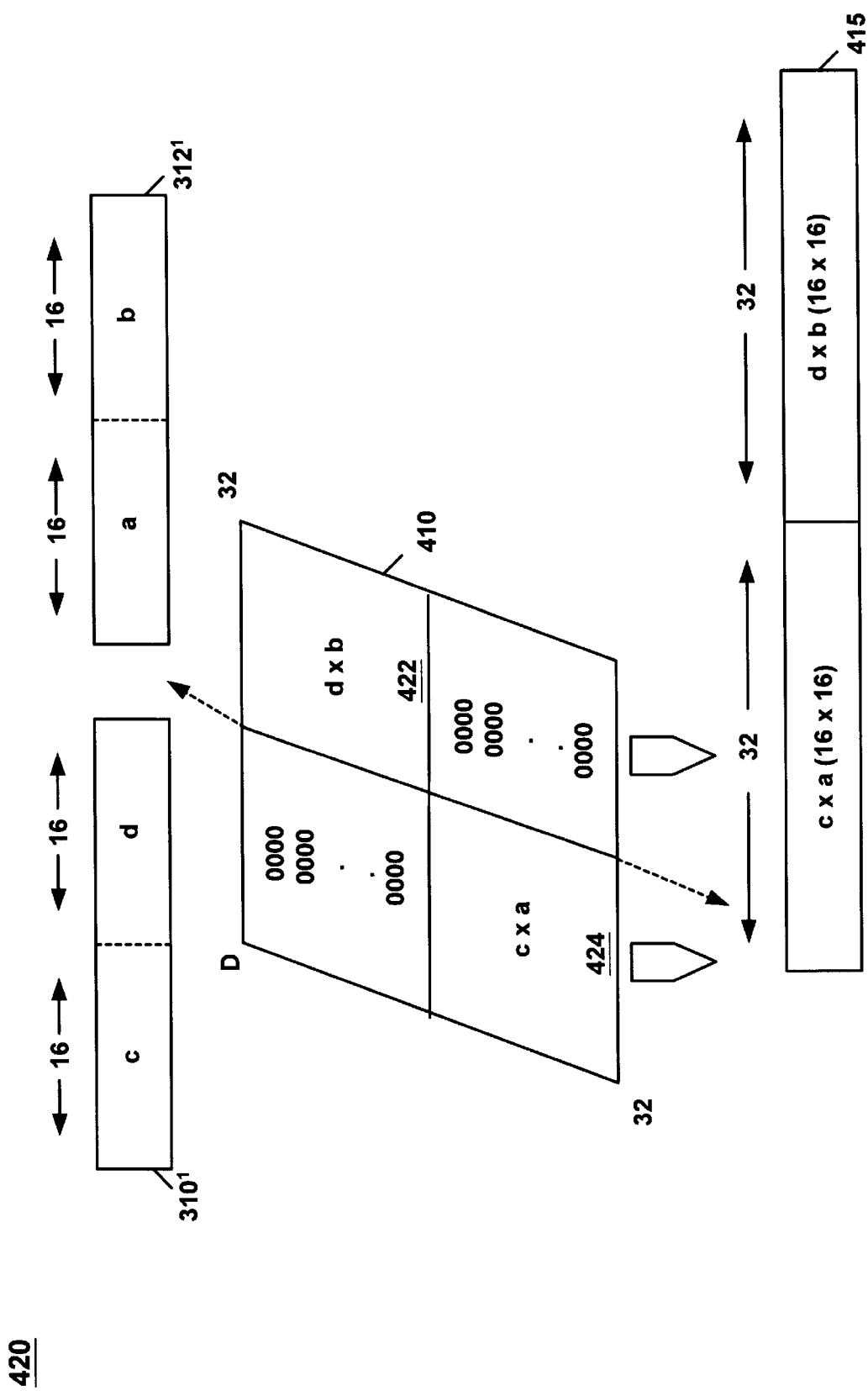

510

| MNEMONIC | INSTRUCTION | OPERATION | OPCODE |
|---|---|---|---|
| ADD | ADD TWO NUMBERS | C = A + B | 000000 |
| SUB | SUBTRACT TWO NUMBERS | C = A - B | 000001 |
| ADDI | ADD IMMEDIATE OPERAND | C = A + IMMEDIATE OPERAND | 000010 |
| CLT | COMPARE FOR LESS THAN | C = 1 IF A<B, ELSE C = 0 (A-B) | 000011 |
| AVG | AVERAGE OF TWO NUMBERS | C = A + B/2 | 000100 |
| CEQ | COMPARE FOR EQUAL TO | C = 1 IF A<B, ELSE C = 0 (A-B) | 000101 |
| CGT | COMPARE FOR GREATER THAN | C = 1 IF A<B, ELSE C = 0 (A-B) | 000111 |
| SMAX | FIND THE MAXIMUM OF TWO NUMBERS | C = A IF A>B, ELSE C = B (A-B) | 001011 |
| SMIN | FIND THE MINIMUM OF TWO NUMBERS | C = A IF A<B, ELSE C = B (A-B) | 001101 |

| MNEMONIC | INSTRUCTION | OPERATION | OPCODE |
|---|---|---|---|
| MULL | MULTIPLY AND SAVE THE LOWER HALF RESULT | AxB | 100000 |
| MULH | MULTIPLY AND SAVE THE LOWER HALF RESULT | AxB | 100001 |
| MULD | MULTIPLY DOUBLE PRECISION | AxB | 100010 |
| MADD | MULTIPLY AND ADD PRODUCTS | AxB | 100011 |

| MNEMONIC | INSTRUCTION | OPERATION | OPCODE |
|---|---|---|---|
| SET | SET ALL ONES | 11111 | 010000 |
| MIXH | MIX HIGH INPUTS | b7a7b6a6.. | 010001 |
| MIXL | MIX LOW INPUTS | b1a1b0a0.. | 010010 |
| SHR | SHIFT RIGHT | C=A> | 010011 |
| SHPR | SHIFT BYTE RIGHT | C=a7>a6> | 010101 |
| SHL | SHIFT LEFT | C=A< | 010100 |
| SHPL | SHIFT BYTE LEFT | C=a7<a6 | 010110 |
| PACK | PACK LARGE NUMBER INTO SMALLER | | 010111 |
| UPKL | UNPACK LOW INPUT NUMBER | | 011000 |
| UPKH | UNPACK HIGH INPUT NUMBER | | 011001 |
| PACKD | PACK TWO OPERANDS | | 011010 |

| MNEMONIC | INSTRUCTION | OPERATION | OPCODE |
|---|---|---|---|
| MAND | AND OF INPUT OPERANDS | | 000100 |
| MNAND | NAND OF INPUT OPERANDS | | 000110 |
| MOR | OR OF THE INPUT OPERANDS | | 001000 |
| MNOR | NOR OF THE INPUT OPERANDS | | 001010 |
| MXOR | XOR OF THE IMPUT OPERANDS | | 001100 |

FIGURE 17

HIGH PERFORMANCE PIPELINED DATA PATH FOR A MEDIA PROCESSOR

RELATED APPLICATIONS

The present application is a continuation in part and claims the benefit of co-pending United States Patent Application entitled "A High Performance Universal Multiplier Circuit" application Ser. No. 09/415,485 filed on Oct. 8, 1999.

BACKGROUND OF THE INVENTION

1. Field of the Invention

The present invention relates to the field of electronic hardware used for processing multimedia content such as digitally encoded signals. More specifically, the present invention relates to a data path architecture that can be used for a multimedia processor and is capable of performing high speed operations on operands of various data types.

2. Related Art

Multimedia processors (often called "coprocessors") are more and more becoming indispensable components of every computer system or electronic device that processes multimedia content. Multimedia content can be audio/visual material that is digitally encoded using any number of different encoding standards, such as MPEG (Motion Picture Expert Group) or DV (Digital Video). Multimedia processors are used to digitally encode the digital multimedia content in order to reduce the amount of computer resources required to both store and transmit the digital content. Multimedia processors are also used to digitally decode the encoded multimedia content for rendering on a display screen and/or a speaker system so that the content can be interpreted by a user or viewer. In addition to being used in a computer system, a multimedia processor can also be used in an embedded system within an electronic device, such as within a digital video disk (DVD) player, a compact disk (CD) player or other consumer electronic device that can process audio/visual content.

Multimedia processors, in addition to being useful for processing multimedia content, can also be used to support other processes such as in real-time applications (e.g., flight simulators, speech recognition, video teleconferencing, computer games, streaming audio/video etc.). It is appreciated that the overall system performance of the multimedia processor is heavily dependent on the speed and architecture of the internal data path of the processor. Typically, the faster the data path can process instructions, and thereby process data, the more desirable the multimedia processor. For instance, processing digital images at 30 frames/second requires the processor to perform nearly 2.2 million multiply operations per second. Therefore, it would be advantageous to design a fast data path architecture that occupies smaller areas on the integrated circuit (IC) chip and that consumes less power.

To achieve real-time processing of media signals, architectural enhancements are necessary in order to alleviate the pressure for performance that is demanded of modem systems and technology. Enhancements to the existing instruction set first came as a result of performance demand that originated from specific computer applications such as graphics applications. Soon after, the enhancements appeared in general purpose processors such as the Intel MMX processor and this event reflected a change in the computational environment and; specifically, a shift towards media processing. These extensions operate on the multiple-data values under the control of a single instruction (SIMD). In most of these processors, data is packed into 64-bit registers in one of the general-purpose register files, reflecting their 64-bit adherence to the 64-bit architectural world. However, this 64-bit architecture is limited in data width and therefore not well suited for high performance graphics processing environments.

In multimedia applications, processor data paths use multiplier circuits to perform a wide range of functions such as Inverse Discrete Cosine (IDCT), Fast Fourier Transforms (FFT), and Multiply Accumulate (MAC) on 8-bit, 16-bit, and 32-bit signed and unsigned operands. However, multipliers that are able to process wide data formats typically consume extra processing cycles to perform the multiplication operation. Therefore, prior art data paths that include multiplier circuits typically have more pipestages in their execution phase to accommodate the wide data format multiply operations. Multiply instructions of these prior art processors require additional execution time to complete thereby consuming valuable processing time. The longer execution phase also acts to reduce the efficiency of other operations that only require one or two execution pipestages for completion. It would be advantageous to provide a more efficient data path that is also able to efficiently perform wide data format multiply operations.

One particular prior art multiplication circuit exists within the Intel MMX processor. This multiplication circuit performs 32-bit multiplication using a 16-bit multiplication circuit that is required to perform two iterations. If larger bit multiplication operations are required, then more iterations are performed. The tradeoff selected in this multiplier design requires that 8-bit multiplication not be supported otherwise too many iterations would be required to support larger bit operations. Since two iterations are required for 32-bit, this multiplication circuit is not able to accept new operands each clock cycle, but rather accepts new operands only every other cycle thereby drastically reducing its data throughput capacity. In another particular example, the Altivec processor of Motorola provides two separate multiplier circuits for large-bit multiply operations, e.g., one circuit for 8-bit and a second circuit for 16-bit. However, this approach is disadvantageous because it includes redundant hardware that increases area and power requirements of the processor. It would be advantageous to provide a circuit capable of large-bit multiply operations having high data throughput that does not have substantial hardware redundancy.

Moreover, in multimedia applications there are several specially adapted multimedia instructions that are useful for processing packed data types, such as those that represent encoded pixels or encoded audio data. Like the multiply operations, these specially adapted multimedia instructions often require the data path of a media processor to have extra pipestages to accommodate the instruction execution. It would be advantageous to provide a more efficient data path that is also able to efficiently process these specially adapted multimedia instructions.

SUMMARY OF THE INVENTION

Accordingly, the present invention provides a pipelined data path architecture for a multimedia processor that is very efficient, consumes less integrated circuit area and dissipates less power compared to conventional media coprocessors. The data path architecture of the present invention is also able to perform wide data format multiply operations within two execution pipestages. The data path architecture of the present invention is also able to perform specially adapted multimedia instructions within the two execution pipestages reserved for the execution phase of the overall pipeline. The data path architecture is also pipelined thereby allowing an instruction latency of two execution pipestages, but a data throughput of only one clock cycle.

What is disclosed is a pipelined data path architecture for use, in one embodiment, in a multimedia processor. The data path architecture requires a maximum of two execution pipestages to perform all instructions including wide data format multiply instructions and specially adapted multimedia instructions, such as the sum of absolute differences (SABD) instruction and other multiply with add (MADD) instructions. Most other instructions require only a single execution pipestage. The data path architecture includes two wide data format operand registers that supply four partitioned 32×32 multiplier circuits. In one embodiment, each operand register is 128-bits wide. Within two pipestages, the multiply circuit can perform one 128×128 multiply operation, four 32×32 multiply operations, eight 16×16 multiply operations or sixteen 8×8 multiply operations in parallel using a SIMD architecture.

The multiply circuit contains a compressor tree which generates a 256-bit sum vector and a 256-bit carry vector. These vectors are stored in pipelined registers and are supplied to four 64-bit carry propagate adder circuits which generate the multiply results in a second execution pipestage. The result register is 256-bits wide and is written into a designated register during a writeback pipestage which follows the execution pipestages. When the data path architecture is performing the specially adapted multimedia instructions, such as the SABD instruction, the input operands are directly fed to a pipelined logic unit. The pipelined logic unit contains adders, subtractors, shifters, average/round/absolute value circuits, and other logic operation circuits, compressor circuits and multiplexers. The output of the pipelined logic unit is then fed to the four 64-bit carry propagate adder circuits which generate the final result. In this way, the carry propagate adder circuits of the multiply operation can be effectively used to also process the specially adapted multimedia instructions thereby saving IC area. Multiply circuitry is disabled by clock gating to save power when the data path architecture is not processing a multiplication instruction.

More specifically, embodiments of the present invention include a pipelined data path circuit comprising: first and second operand registers for storing first and second operands, respectively; a partitioned multiplier coupled to the first operand register and the second operand register and for generating, in a first execution pipestage, compressed first and second partial products which are stored in first and second pipeline registers, respectively; a logic circuit coupled to the first operand register and the second operand register and for generating, in the first execution pipestage, absolute differences between the first operand and the second operand, the absolute differences stored in a third pipeline register; a partitioned carry propagate adder configured in a first mode for adding the first and second compressed partial products in a second execution pipestage to produce a multiply result value stored in a result register, the partitioned carry propagate adder also configured in a second mode for summing the absolute differences in the second execution pipestage to produce a sum result value stored in the result register, wherein the result values are produced with two cycle latency and with single cycle throughput.

BRIEF DESCRIPTION OF THE DRAWINGS

FIG. 6A, FIG. 6B and FIG. 6C illustrate three modes of operation for the four 32×32 multipliers in accordance with the data path of the present invention.

FIG. 14 lists the add and subtract instructions processed by the data path architecture in accordance with an embodiment of the present invention.

FIG. 15 lists the multiply instructions processed by the data path architecture in accordance with an embodiment of the present invention.

FIG. 16 lists the shift and pack instructions processed by the shifter block of the data path architecture in accordance with an embodiment of the present invention.

FIG. 17 lists the shift and pack instructions processed by the logic block of the data path architecture in accordance with an embodiment of the present invention.

DETAILED DESCRIPTION OF THE INVENTION

In the following detailed description of the present invention, a high performance data path architecture for a multimedia processor, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Related Cases Incorporated Herein

The following co-pending United States patent applications are hereby incorporated by reference: 1) co-pending U.S. patent application entitled "A Multiplexer-Based Parallel N-Bit Adder Circuit for High Speed Processing," filed on Mar. 23, 1999, Ser. No. 09/275,068, by Chehrazi, Oklobdzija and Farooqui; 2) co-pending United States patent application entitled, "Multiplier Circuit Having Optimized Booth Encoder/Selector," filed on Mar. 29, 1999, Ser. No. 09/280,176 by Chehrazi, Oklobdzija and Farooqui; 3) co-pending United States Patent Application entitled, "A High Performance Universal Multiplier Circuit," filed on Oct. 8, 1999, Ser. No. 09/415,485 by Chehrazi, Oklobdzija and Farooqui, attorney docket SONY-50N3285; and 4) co-pending U.S. patent application entitled "A Partitioned Shift Right Logic Circuit Having Rounding Support," filed on Jul. 12,1999, Ser. No. 09/351,273, by Farooqui, Chehrazi, Oklobdzija and Wei-Jen Li, attorney docket SONY-50N3202.

Computer System Embodiment

Figure 1:
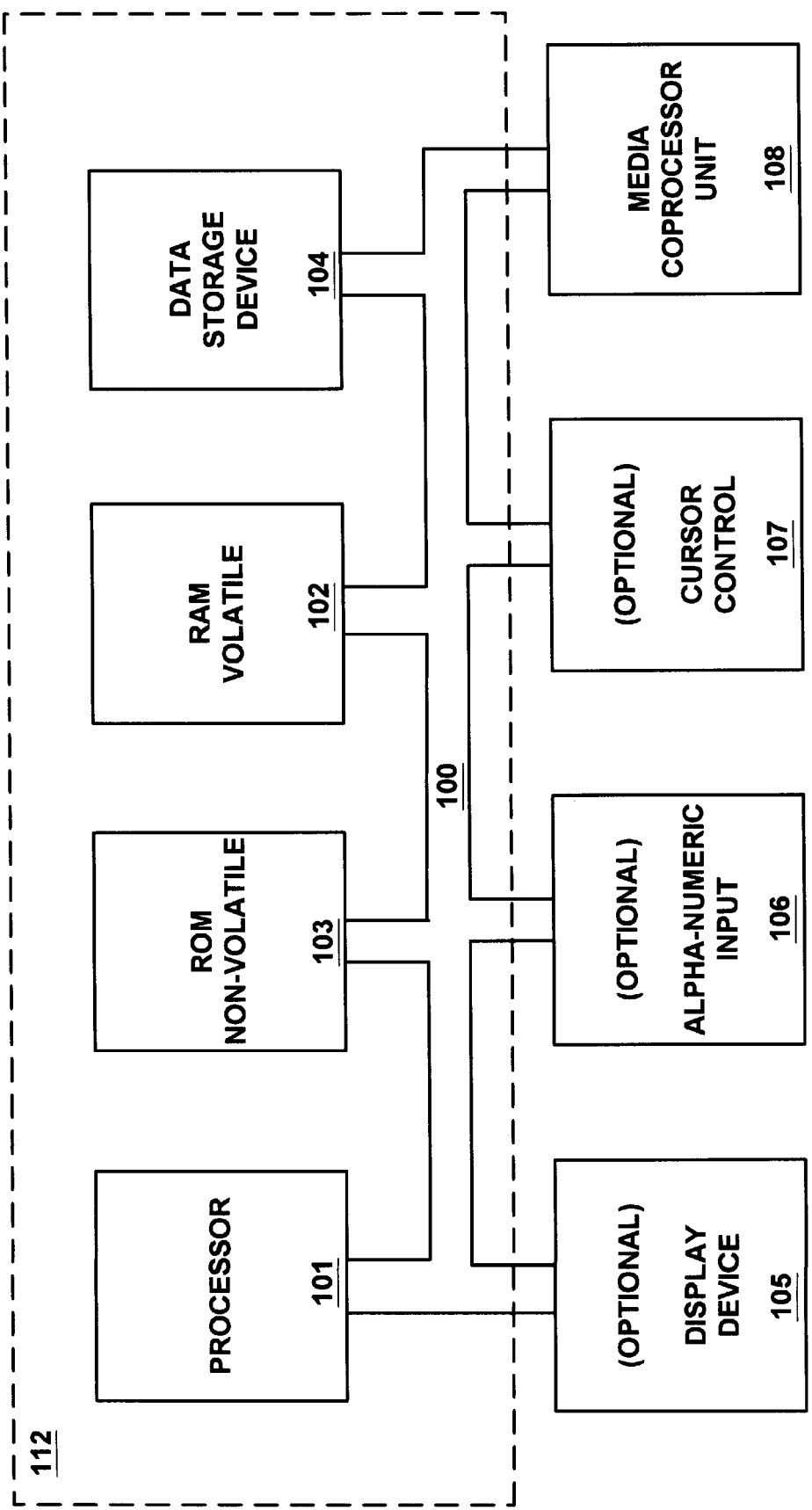
FIG. 1 is a block diagram of a general purpose computer system having a media coprocessor unit which has the pipelined data path architecture in accordance with the present invention.

The present invention is drawn to a high performance data path architecture for a processor, e.g., a multimedia processor. The multimedia processor can be located within an embedded computer system, for instance, within a consumer electronic device or it can be integrated as a part of a general purpose computer system in which case it is called a media coprocessor. FIG. 1 illustrates a computer system 112 including the multimedia coprocessor 108. Media coprocessor 108 is coupled to the bus 100 and is for decoding digital multimedia content for rendering on device 105, for instance. In addition to the coprocessor 108, computer system 112 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user.

Also included in computer system 112 of FIG. 1 is an optional alphanumeric input device 106 including alphanumeric and function keys coupled to the bus 100 for communicating information and command selections to the central processor 101. System 112 also includes an optional cursor control or directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. The display device 105 utilized with the computer system 112 is optional and may be a liquid crystal device, cathode ray tube (CRT), field emission device (FED, also called flat panel CRT) or other display device suitable for creating graphic images and alphanumeric characters recognizable to the user.

Data Path Circuit of the Present Invention

Figure 2:
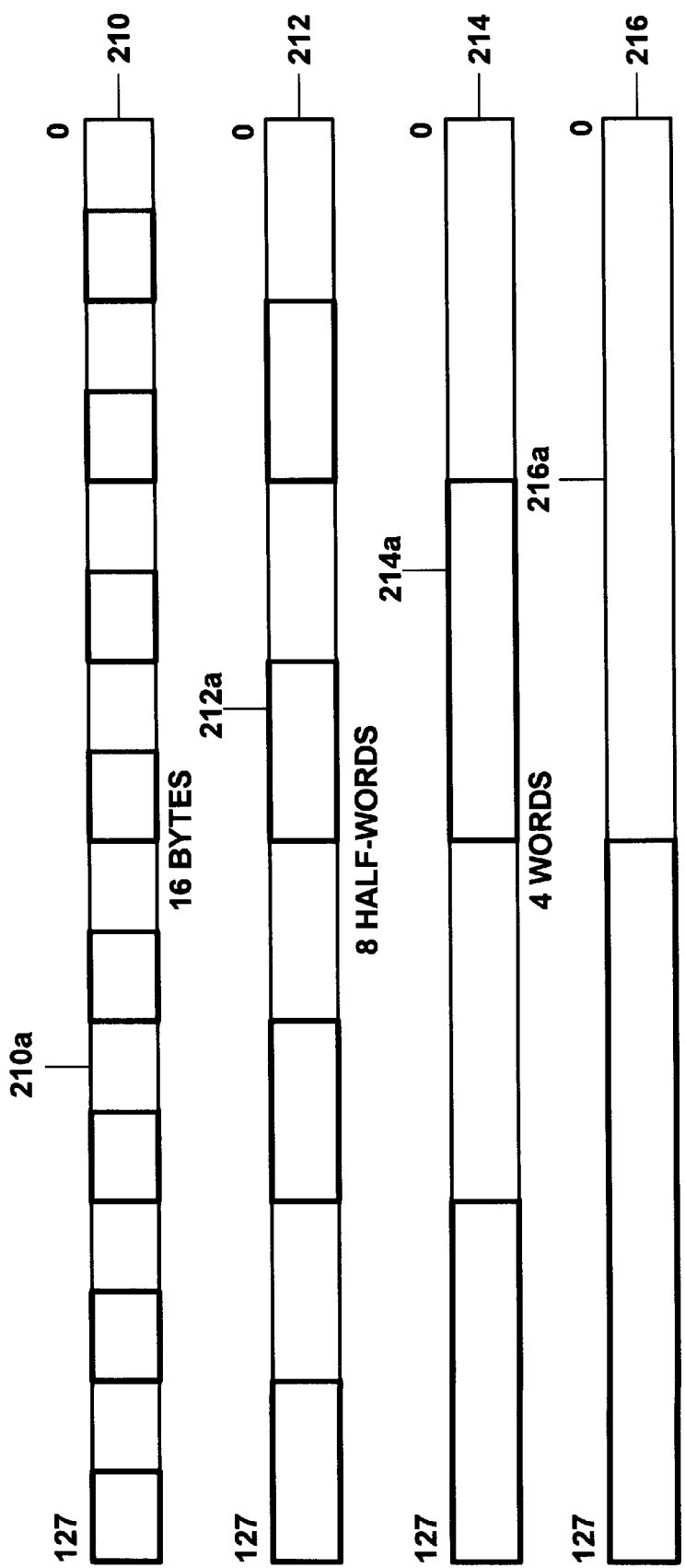
FIG. 2 illustrates various packed data types of various data widths processed by the pipelined data path of one embodiment of the present invention.

FIG. 2 illustrates exemplary data types supported by the data path architecture of the multimedia processor 108 of the present invention. These data types are contained in a 128-bit media word containing packed fixed-point integers. The 128-bit width is specially adapted for media processing because in many pixel-processing procedures (e.g., motion compensation), the pixels are arranged in 8-bit words and each 128-bit register can therefore accommodate 16 pixels per instruction in some data formats. Moreover, in audio processing the data is often presented 16-bit lengths and each 128-bit register can accommodate 8 separate audio data pieces. The decimal point for the fixed-point values is assumed to be to the right of the least significant bit (LSB) for the fixed-point integers. When the fixed-point fractions are assumed, the decimal point is assumed to be to the right of the most significant bit (MSB), e.g., Q-format. Word 210 of FIG. 2 is a packet byte 128-bit data type with each of the 16 sections, e.g., 210a, being a separate 8-bit byte. Word 212 is a packet half-word 128-bit data type with each of the 8 sections, e.g., 212a, being a separate 16-bit half-word. Word 214 is a packet full-word 128-bit data type with each of the 4 sections, e.g., 214a, being a separate 32-bit full-word. Lastly, word 216 is a packet double-word 128-bit data type with each of the 2 sections, e.g., 216a, being a separate 64-bit double-word. When supplied with a multi-operand input register as shown in FIG. 2, the data path circuit of thepresent invention executes the accompanying instruction on each of the data segments in parallel, e.g., a SIMD architecture, to generate multiple results which are then simultaneously stored in a single output or destination register.

Figure 3:
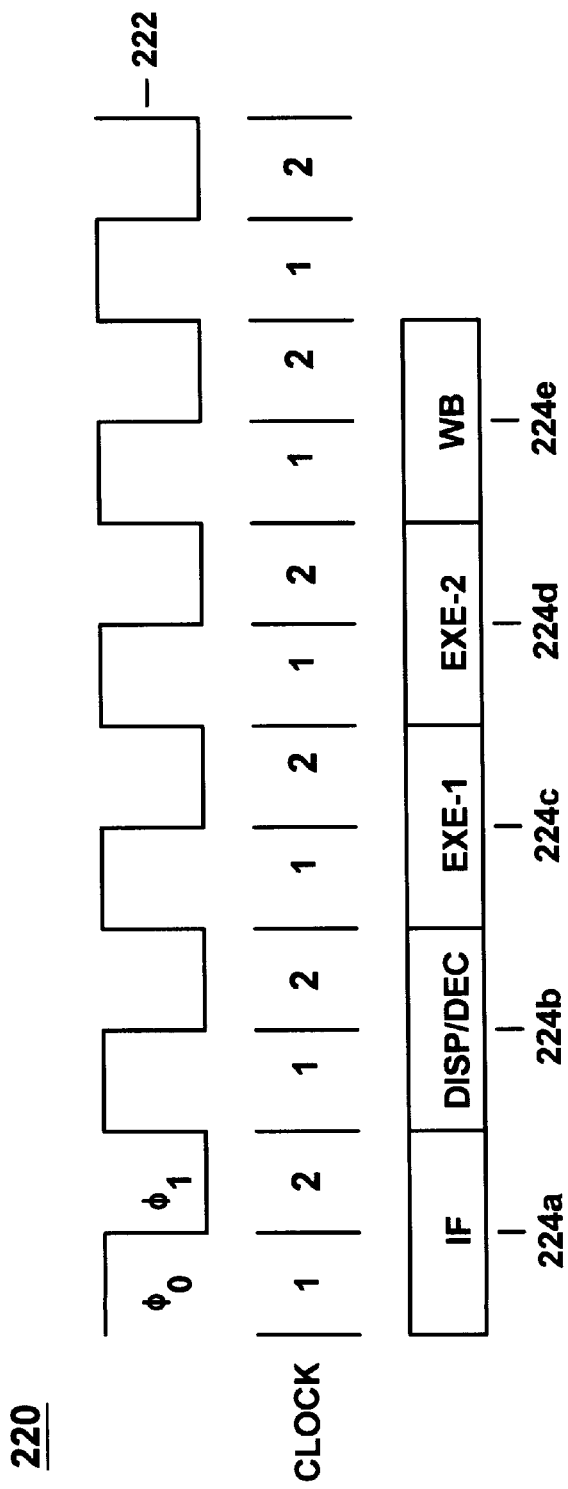
FIG. 3 illustrates the clocked pipestages of the pipelined data path of one embodiment of the present invention.

FIG. 3 illustrates the pipeline 220 utilized by the data path architecture of one embodiment of the present invention. Pipeline 220 includes five pipestages including an instruction fetch stage 224a, an instruction decode and dispatch stage 224b, two execution stages 224c–d and a data write-back stage 224e. Each stage consumes a full clock cycle from clock signal 222. In one embodiment, the clock signal frequency is 200 MHz. Each clock cycle includes a first clock phase "1" (clock high) and a second clock phase "2" (clock low). Instructions are fetched in the IF cycle 224a. During the decode cycle 224b, the media instructions are recognized by a co-processor specified field which has a value of "010010B" in one implementation.

An instruction is dispatched to the decode unit associated with the data path during pipestage 224b. Load and Store operations are recognized during the decode cycle 224b, in which case an integer unit proceeds in forming the address of the memory location that is being accessed. A token is passed to the media processor from the integer unit to signal that media processor is to receive data, or to prepare data (that is being stored into memory) and make it available. In the case of a cache miss, the cancellation is signaled to the media processor. The media instructions in general require two cycles to execute, shown as execution cycles 224c–224d. After the result is processed, it is written to a media register file (MRF) in the writeback cycle 224e. Pipelining allows single cycle throughput even with two cycle execution latency. Therefore, the 128-bit input register allows up to 16 pixel operations per instruction (8-bit pixel data) and an instruction can have single cycle throughput, thereby allowing a pixel throughput of 16 processed pixels per clock cycle, in one embodiment. The 128-bit input register allows up to 8 audio operations per instruction (16-bit audio data) and an instruction can have single cycle throughput, thereby allowing an audio throughput of 8 processed audio data pieces per clock cycle, in one embodiment. The MRF, in one embodiment, contains 32 registers which are each 128-bits wide. The media data path of the present invention is also 128-bits wide in one embodiment and contains arithmetic units which are necessary to support an efficient execution of media instructions. Instructions that utilize two operands designate at least two source registers of the MRF, herein these registers are called Vs and Vt for simplicity. The destination register is often called Vd.

Figure 4:
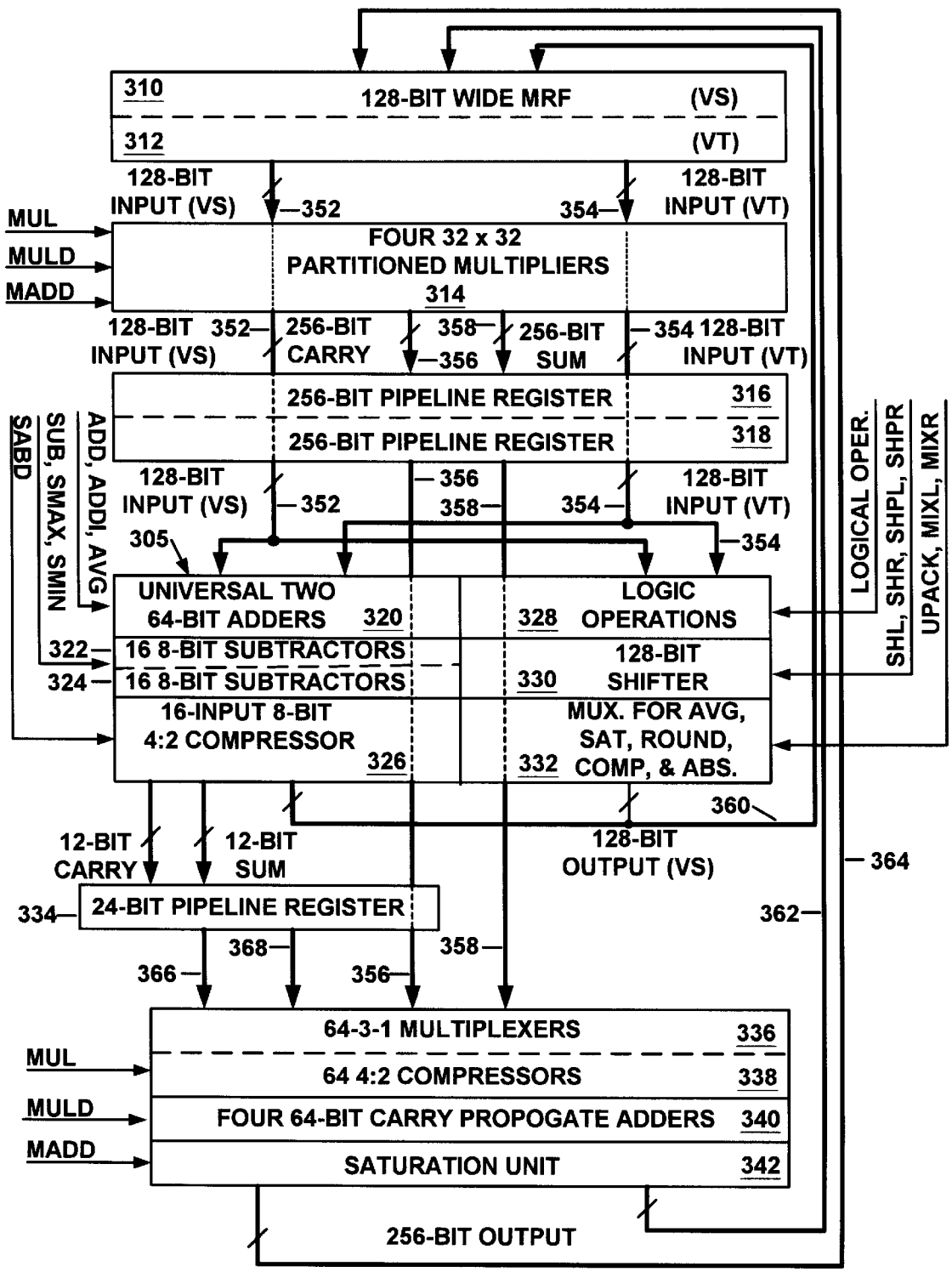
FIG. 4 is a block diagram of the architecture of the pipelined data path for a media processor in accordance with one embodiment of the present invention.

FIG. 4 illustrates one embodiment of the data path architecture ("data path") 300 of the media processor 108 of the present invention. In the exemplary data path of FIG. 4, a 128-bit data path width is utilized and accepts 128-bit input registers that can be partitioned to each contain multiple operands (e.g., 16 8-bit operands, 8 16-bit operands, 4 32-bit operands, etc.). The data path 300 provides a single instruction multiple data (SIMD) approach as applied for multimedia applications. In other words, the data path 300 allows one instruction type, e.g., multiplication, addition, subtraction, to be performed in parallel on the multiple operands that can be packed into each input register thereby generating multiple results at the same time. The data path circuit 300 processes all instructions at most within two execution pipestages and most instructions require only a single execution pipestage. In one embodiment, the data path circuit 300 requires 5 nanoseconds per cycle for execution of an instruction. Pipelining allows all instructions to be executed with a single cycle throughput even if they require two cycle latency.

Two MRF registers, Vs 310 and Vt 312, of FIG. 4 are designated as input registers by the processed instruction and supply two 128-bit values to a partitioned multiplier circuit 314. Each MRF register is 128-bits wide. Register 310 supplies information over 128-bit bus 352 and register 312 supplies information over 128-bit bus 354. As discussed above, depending on the partition mode employed, each register, Vs or Vt, can represent one or multiple input operands. The partitioned multiplier circuit ("multiplier circuit") 314 is pipelined and therefore operates during the first execution pipestage 224c of FIG. 3.

Figure 6A:
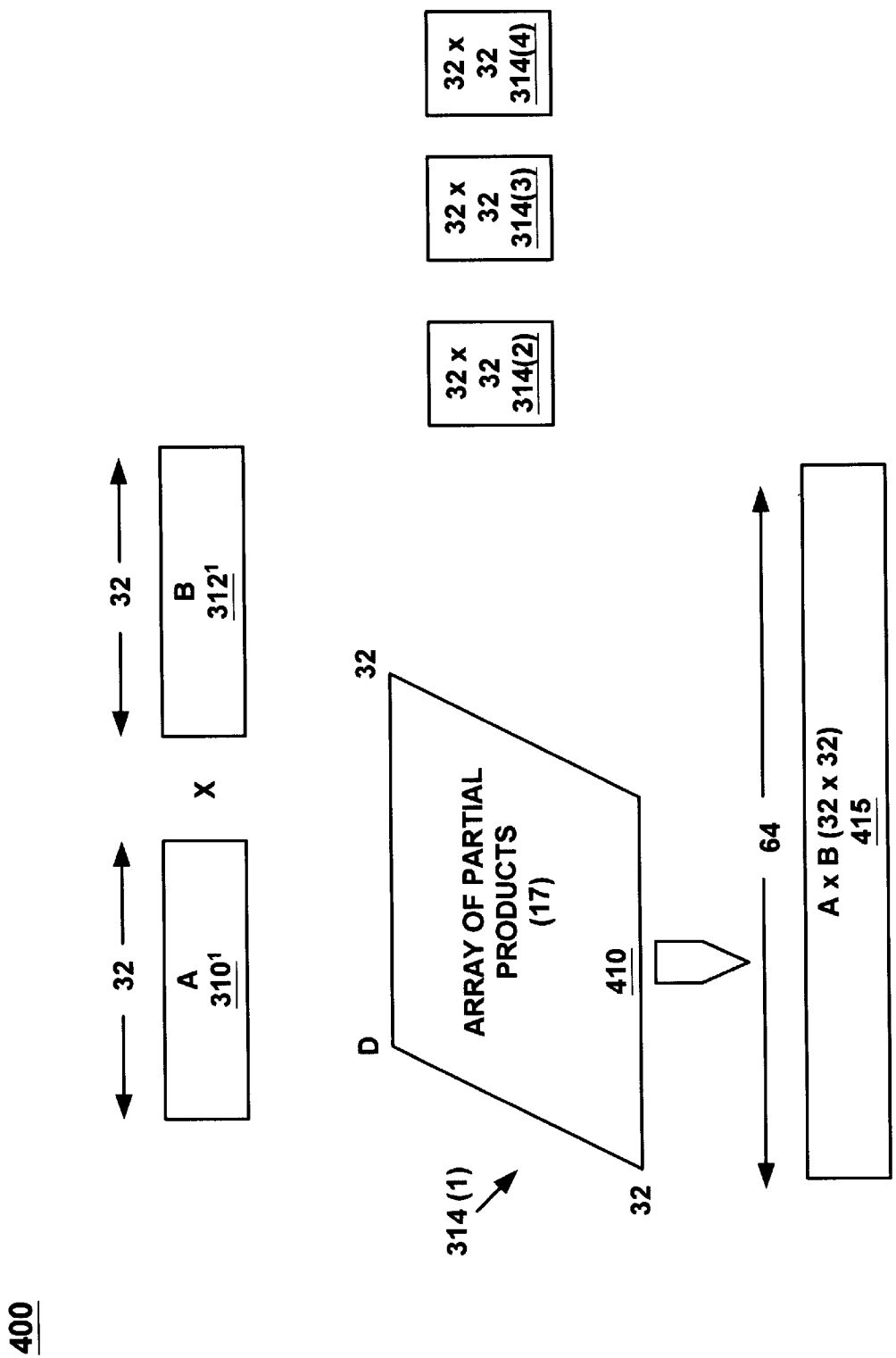
Figure 6C:
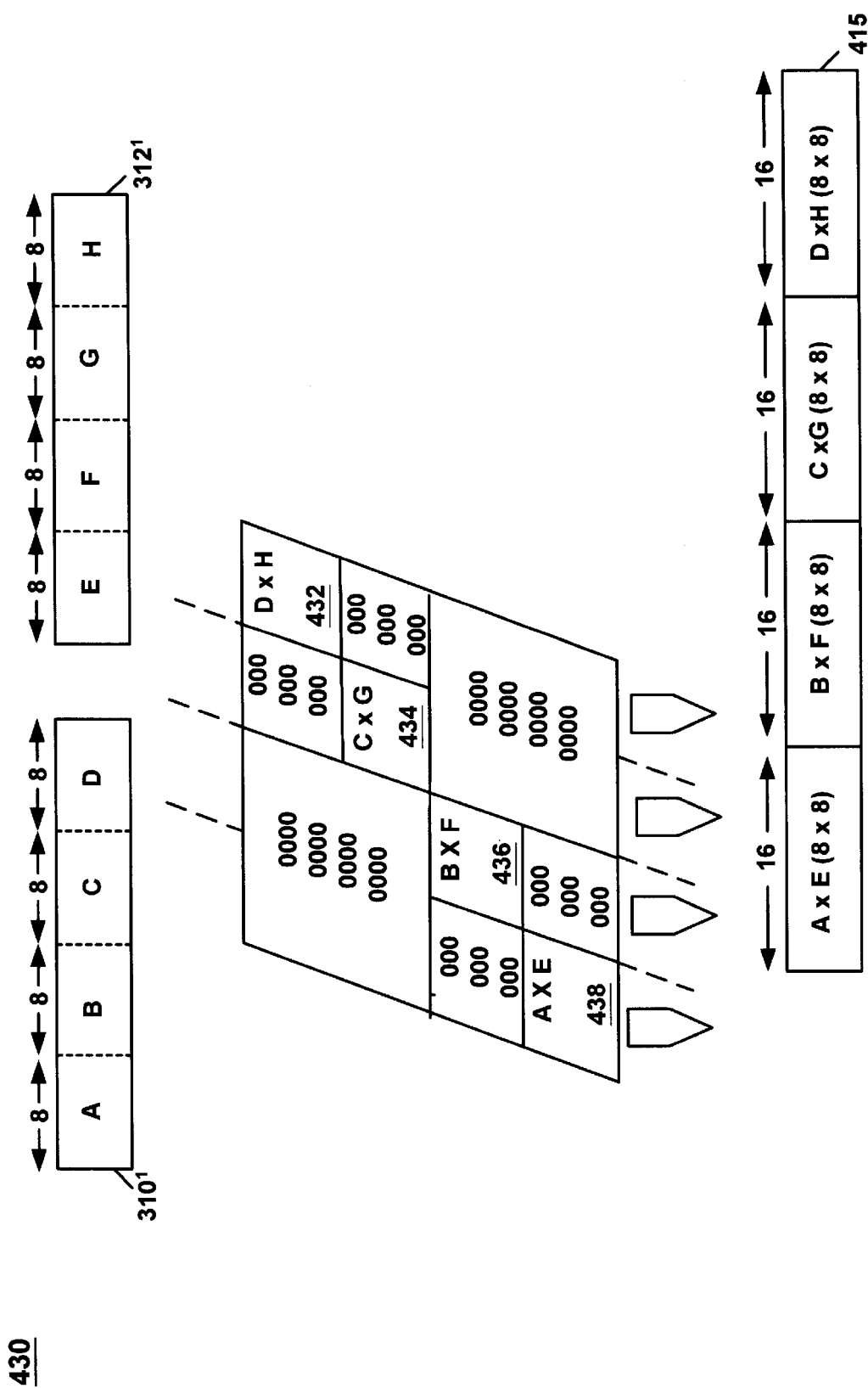

The partitioned multiplier circuit 314 is described in co-pending United States patent application entitled, "A High Performance Universal Multiplier Circuit," filed on Oct. 8,1999, Ser. No. 09/415,485 by Chehrazi, Oklobdzija and Farooqui, attorney docket SONY-50N3285. The multiplier circuit 314 consists of four 32×32 partitioned multipliers. Each 32×32 partitioned multiplier of circuit 314 can be partitioned to operate in the modes as shown in FIG. 6A, FIG. 6B and FIG. 6C which are described below. Booth encoding is used to generate 17 partial products from the first and second 128-bit operands. Circuitry for performing Booth encoding is described in co-pending United States patent application, entitled "Multiplier Circuit Having Optimized Booth Encoder/Selector," filed on Mar. 29, 1999, Ser. No. 09/280,176 by Chehrazi, Oklobdzija and Farooqui. These 17 partial products are compressed using a compressor tree into one 256-bit sum output (stored in pipeline register 316) which is supplied over 256-bit bus 356 and one 256-bit carry output (stored in pipeline register 318) which is supplied over 256-bit bus 358. These are the compressed partial products. Depending on the partition mode employed, the compressed partial products stored in registers 316 and 318 can represent one or multiple results. Multiply circuit 314 processes the multiply instructions MUL, MULD and MADD.

FIG. 4 also illustrates that buses 352 and 354 of data path 300 are supplied to a pipelined logic circuit 305 that contains two universal 64-bit adders 320, two separate sixteen 8-bit subtractors 322 and 324, a 16-input 8-bit 4:2 compressor 326, a 128-bit shifter 330, a logic circuit 328 and a multiplexer 332 for average, saturate, round, compressing and absolute value computations. Therefore, the input registers 310 and 312 directly supply the pipelined logic circuit 305. One embodiment of the shifter circuit 330 is described in co-pending U.S. patent application entitled "A Partitioned Shift Right Logic Circuit Having Rounding Support," filed on Jul. 12, 1999, Ser. No. 09/351,273, by Farooqui, Chehrazi, Oklobdzija and Wei-Jen Li, attorney docket SONY-50N3202. Buses 356 and 358 are coupled to registers 316 and 318 and also directly couple to the input of a carry propagate adder circuit 340 that in one implementation is four 64-bit carry propagate adders. With respect to instructions that require two execution pipestages, the operation of multiplexer 314 and the operation of the pipelined logic unit 305 are performed during the first execution pipestage; the carry propagate adder circuit 340 operates during the second execution pipestage.

One implementation of the carry propagate adder circuit 340 is described in co-pending United States patent application entitled, "A Multiplexer-Based Parallel N-Bit Adder Circuit for High Speed Processing," filed on Mar. 23, 1999, Ser. No. 09/275,068, by Chehrazi, Oklobdzija and Farooqui. The output of the carry propagate adder circuit 340 is a 256 bit result which depending on the mode of operation can represent one or multiple values. The results of execution are stored in the instruction-designated destination register, Vd. With respect to the pipelined logic unit 205, the two separate sixteen 8-bit subtractors 322 and 324 are used in the execution of the sum of absolute differences (SABD) instruction as described further below. The output of the logic circuit, in one mode, is a 24-bit pipelined register 334 which is coupled to a 64-3-1 multiplexer 336 and a 64 4:2 compressor circuit 338. The 64 4:2 compressor circuit 338 and the 64-3-1 multiplexer 336 are used in the multiply and add instruction, such as MADD. The multiplexer circuitry 332 of pipelined logic unit 305 is used for selection of positive differences in the SABD instruction.

In accordance with an embodiment of the present invention, the carry propagate adder circuitry 340 is used in both multiplication instructions and is also used in the execution of the SABD instruction. Both of these instruction types are pipelined and have a two cycle latency but a single cycle throughput as a result of pipelining. In the operation of the multiply instruction by the data path circuit 300 of the present invention, during the first execution pipestage (224c of FIG. 3), the multiplication circuitry 314 accesses the two operands of Vs and Vt from registers 310 and 312 and generates the two compressed partial products (sum and carry) and stores them into 256-bit registers 316 and 318. In the second execution pipestage (224d of FIG. 3), the two compressed partial products (sum and carry) are added by the carry propagate adder circuit 340 to generate a single 256-bit result which is written to the register file (MRF)

during the writeback pipestage (224e of FIG. 3). The same is true with respect to MADD instructions, except the multiplexers 336 and compressors 338 format the data to effect the appropriate addition operation before adder 340 operates.

In the operation of the SABD instruction by the data path circuit 300 of the present invention, each operand of Vs and Vt, contains 16 separate 8-bit values. The instruction is executed in two execution clock cycles. With respect to the SABD instruction, during the first execution pipestage (224c of FIG. 3) the two 16 8-bit subtractor circuits 322 and 324 perform subtraction operations on the input operands Vs and Vt. For instance, the 16 8-bit subtractor circuit 322 performs Vs–Vt on respective 8-bit bytes and the 16 8-bit subtractor circuit 324 performs Vt–Vs on respective 8-bit bytes. This generates 32 differences during the first execution pipestage. The multiplexer circuit 332 of the pipelined logic then selects only the positive differences thereby generating only the absolute value differences and generates a 12-bit sum and a 12-bit carry from the absolute value differences. These results are stored in the 24-bit pipelined register 334. On the second execution pipestage (224d of FIG. 3), the absolute value differences of Vs and Vs are represented as the results stored in the 24-bit pipelined register 334. These are summed together by the carry propagate adder 340 to generate a 256-bit result which is written to the register file (MRF) during the writeback pipestage (224e of FIG. 3).

Figure 18A:
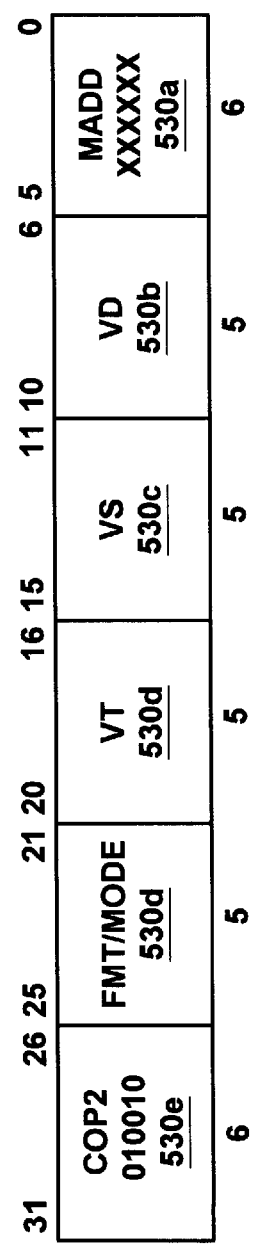
FIG. 18A illustrates the instruction format for the MADD instruction in accordance with an embodiment of the present invention.
Figure 18B:
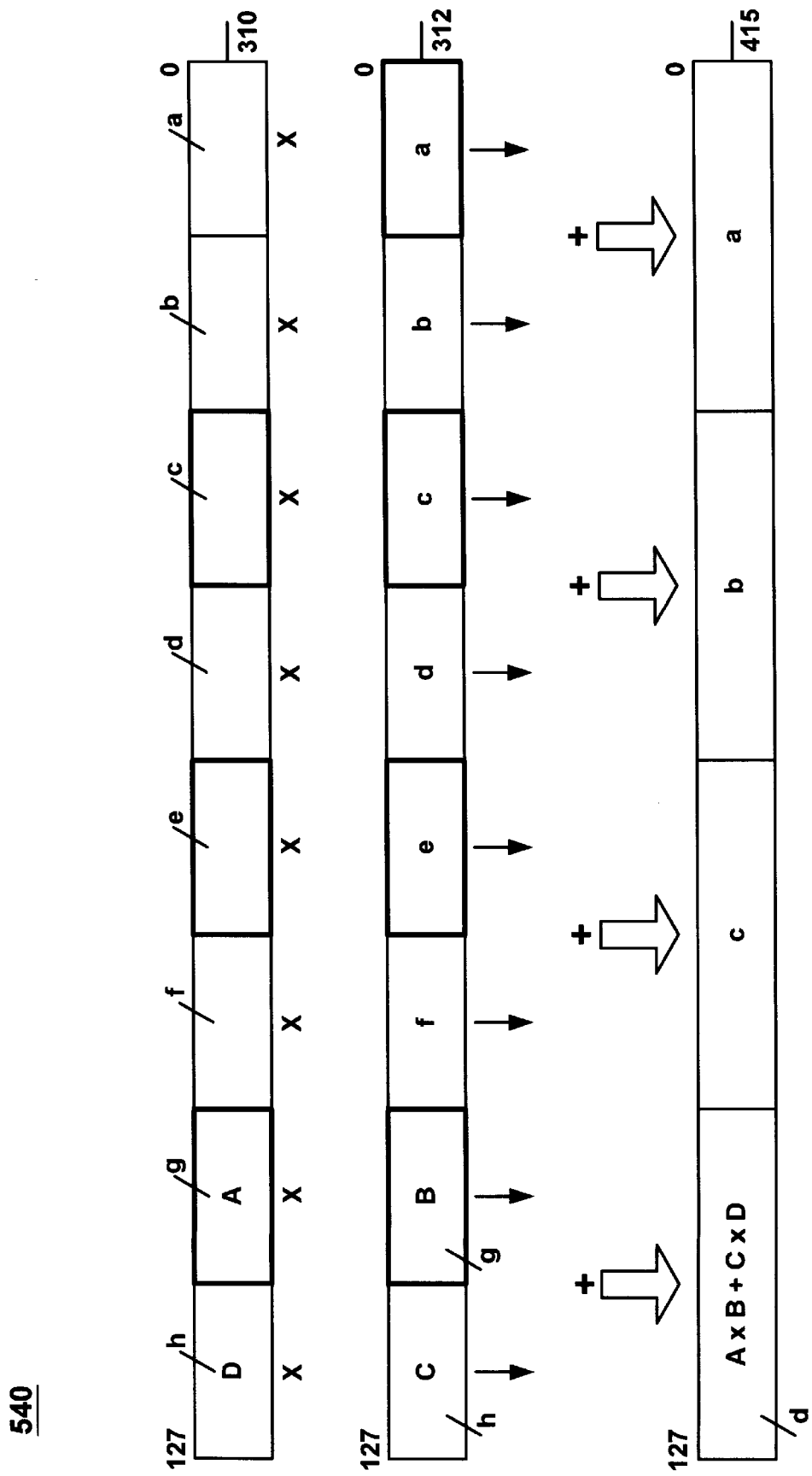
FIG. 18B is a diagram of the operation of the MADD instruction in accordance with an embodiment of the present invention where each result is an addition of two intermediate multiplication results.
Figure 19:
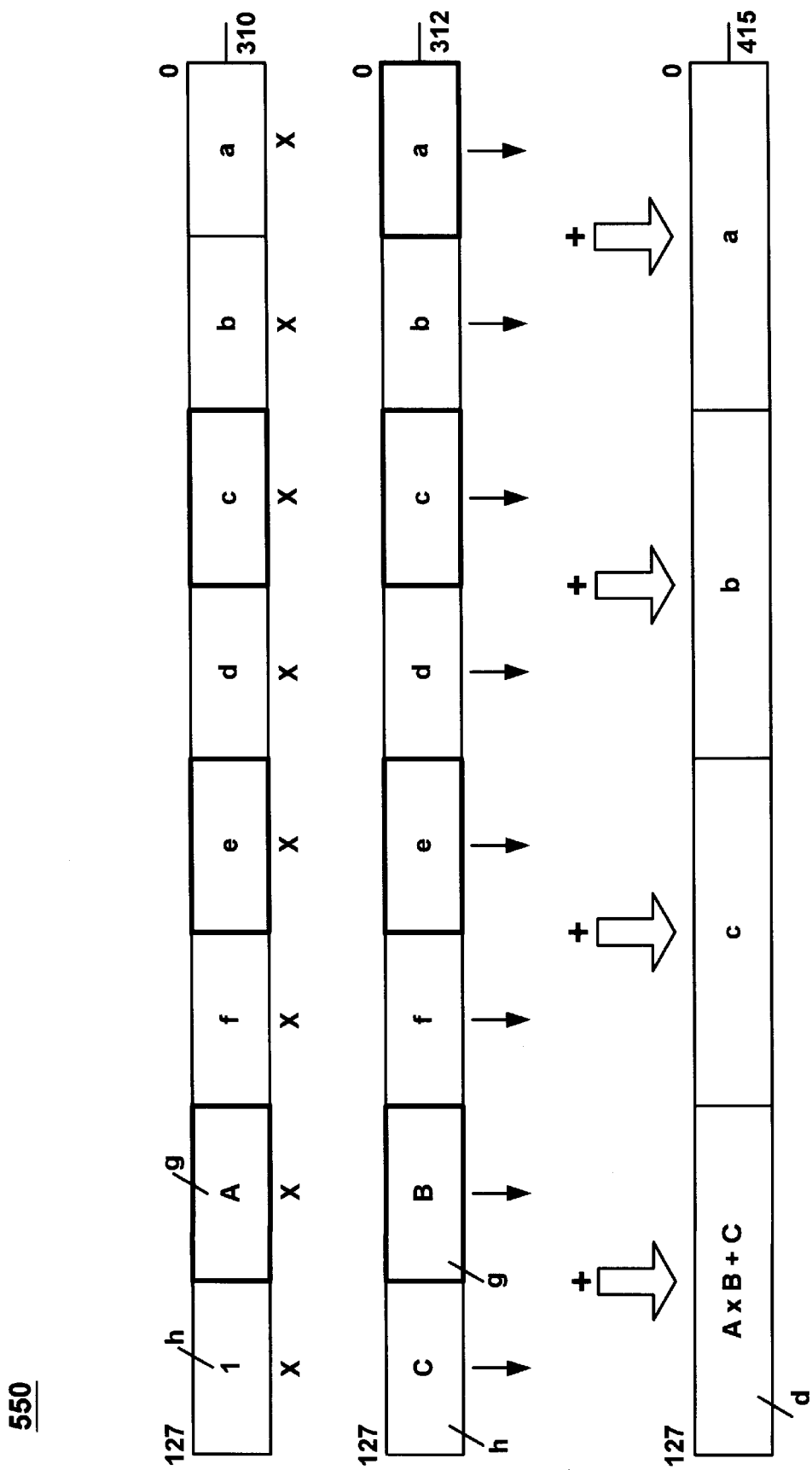
FIG. 19 is a diagram of the operation of a multiply add instruction where each result is an addition of an operand and a multiplication result.

In the operation of the MADD instruction by the data path circuit 300 of the present invention, each operand of Vs and Vt, contains 8 separate 16-bit values. The instruction is executed in two execution clock cycles. With respect to the MADD instruction, during the first execution pipestage (224c of FIG. 3) respective 16-bit operands from Vs and Vt are multiplied together within the partitioned multiplier 314 to form eight separate products stored in pipelined registers 316 and 318. On the next pipestage, registers 316 and 318 are processed by the 64 4:2 compressors circuit 338 and then added together by the carry propagate adder 340 so that four results are formed, each result being an addition of two products as shown in FIG. 18A and FIG. 18B. The carry propagate adder 340 generates a 256-bit result which is written to the register file (MRF) during the writeback pipestage (224e of FIG. 3). Other formats of two cycle multiply addition instructions are also supported by data path circuit 300 as shown in the diagrams of FIG. 19.

Figure 5A:
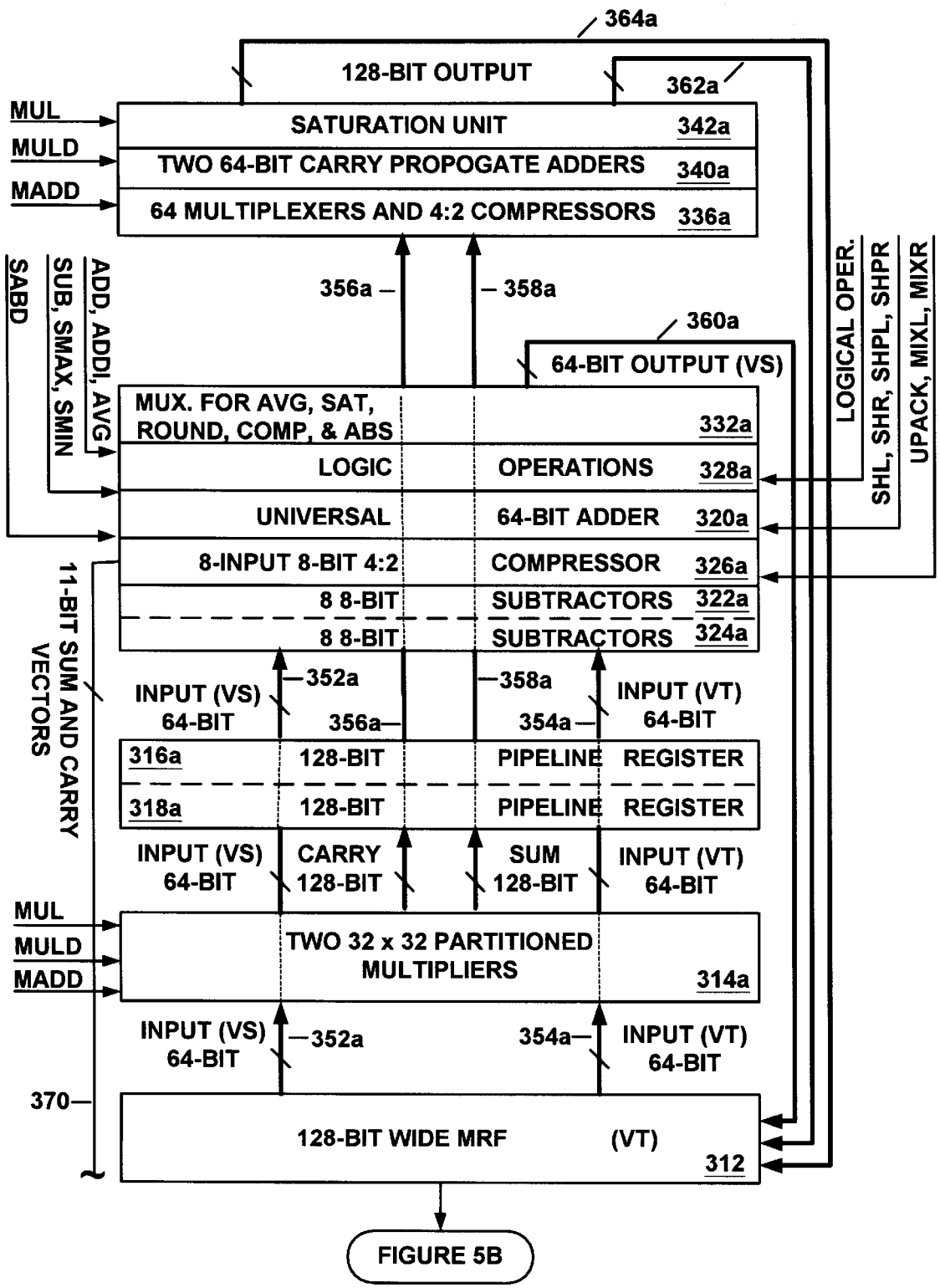
FIG. 5A and FIG. 5B illustrate a block diagram of an exemplary layout of the pipelined data path for a processor in accordance with one embodiment of the present invention.
Figure 5B:
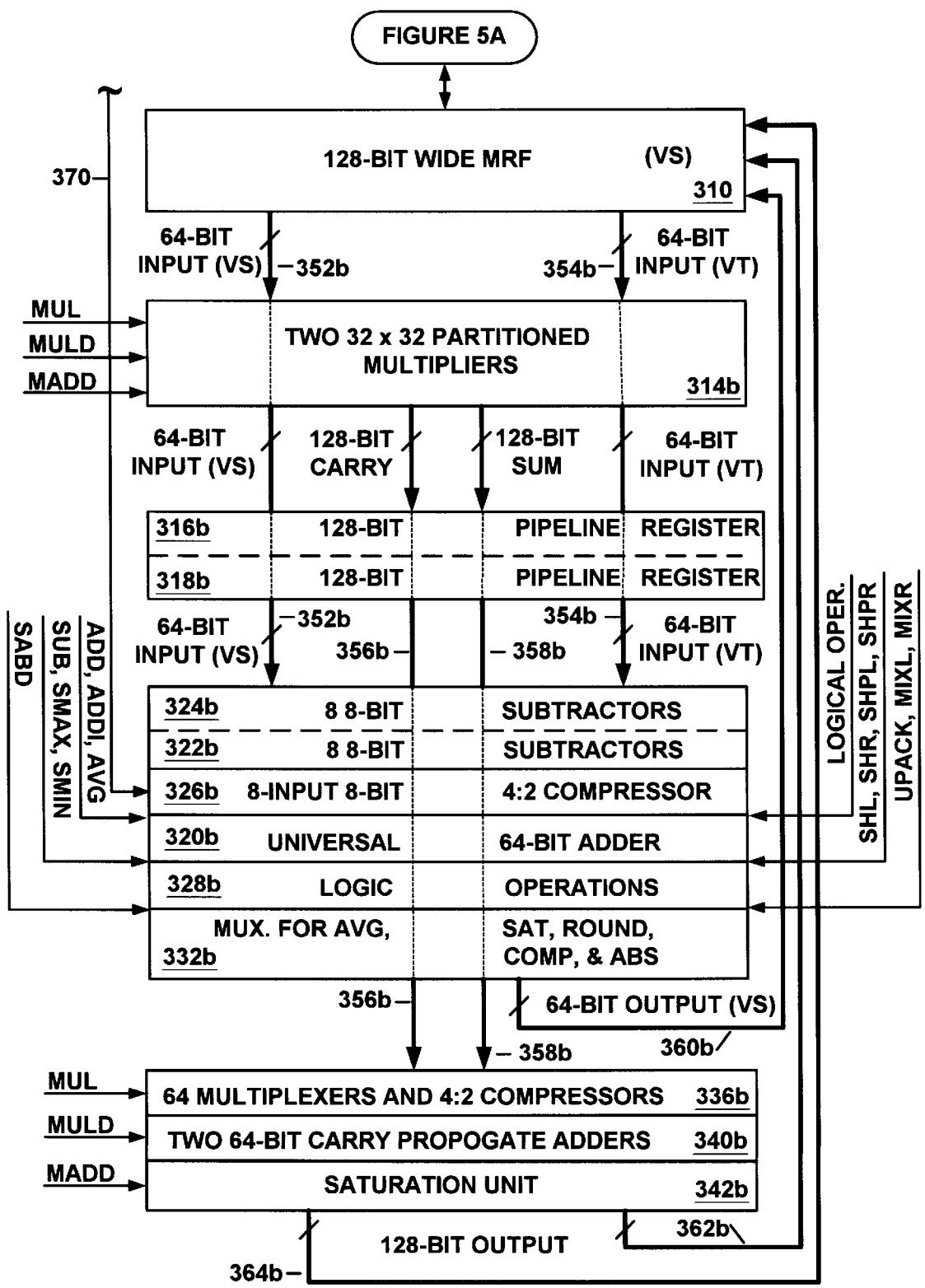

Although a variety of different layouts can be adopted for the data path circuit 300 of FIG. 4, FIG. 5A and FIG. 5B illustrate an exemplary layout adopted in one embodiment of the present invention. The layout 300a is split across FIG. 5A and FIG. 5B with the components of FIG. 5A disposed above FIG. 5B according to the diagram. The data path circuit 300 is partitioned, therefore, FIG. 5A illustrates one partition which generates 128-bits of the 256-bit result register and FIG. 5B illustrates the other partition which generates the other 128-bits. As shown in FIG. 5A, 64 bits of the 128-bit wide register Vt are coupled to two of the 32×32 partitioned multipliers 314a via bus 354a. Also, 64 bits of the 128-bit wide register Vs (FIG. 5B) are coupled to two of the 32×32 partitioned multipliers 314a via bus 352a. Two of the 32×32 partitioned multipliers 314a are coupled to 128-bits 316a and 318a of each of the 256-bit pipeline registers 316 and 318. Each 128-bit data is coupled, via bus 356a and bus 358a, to 64 multiplexers and 4:2 compressors 336a, to two 64-bit carry propagate adder circuits 340a and to a saturation unit 342a. The two 64-bit carry propagate adder circuits 340a generate 128-bits (over bus 364a and bus 362a) of the 256 bit result which is written during the writeback pipestage 224e.

The 64-bits of Vs and 64-bits of Vt are also supplied to the logic unit, via bus 356a and bus 358a. The logic unit includes two separate eight 8-bit subtractors 324a and 322a, an 8-input 8-bit 4:2 compressor 326a, a universal 64-bit adder 320a, a logic operations circuit 328a and a multiplexer circuit 332a. The results of the logic unit are supplied to the 64 multiplexers and 4:2 compressors 336a, the two 64-bit carry propagate adder circuits 340a and to the saturation unit 342a via a pipeline register not shown. Bus 370 supplies 11-bit sum and carry vectors between circuit 326a and circuit 326b (FIG. 5B).

As shown in FIG. 5B, the other 64 bits of the 128-bit wide register Vs are coupled to two of the 32×32 partitioned multipliers 314b via bus 352b. Also, the other 64 bits of the 128-bit wide register Vt (FIG. 5A) are coupled to two of the 32×32 partitioned multipliers 314b via bus 354b. Two of the 32×32 partitioned multipliers 314b are coupled to 128-bits 316b and 318b of each of the 256-bit pipeline registers 316 and 318. Each 128-bit data is coupled, via bus 356b and bus 358b, to 64 multiplexers and 4:2 compressors 336b, to two 64-bit carry propagate adder circuits 340b and to a saturation unit 342b. The two 64-bit carry propagate adder circuits 340b generate 128-bits (over bus 364b and bus 362b) of the 256 bit result which is written during the writeback pipestage 224e.

The 64-bits of Vs and 64-bits of Vt are also supplied to the logic unit, via bus 356b and bus 358b of FIG. 5B. The logic unit includes two separate eight 8-bit subtractors 324b and 322b, an 8-input 8-bit 4:2 compressor 326b, a universal 64-bit adder 320b, a logic operations circuit 328b and a multiplexer circuit 332b. The results of the logic unit are supplied to the 64 multiplexers and 4:2 compressors 336b, the two 64-bit carry propagate adder circuits 340b and to the saturation unit 342b via a pipeline register not shown.

FIG. 6A is a diagram 400 illustrating a multiplication operation of the multiplier circuit 314 when partitioned to perform four 32×32 bit multiplication operations. Circuit 314 is divided in four 32×32 multipliers 314(1)–314(4). Focus is provided on 32×32 multiplier 314(1) as the others 314(2)–314(4) operate in an analogous fashion. A 32-bit operand, A, is stored in register portion 310' of register Vs and a 32-bit operand, B, is stored in register portion 312' of register Vt. Circuit 314(1) generates an array of 17 partial products as shown in partial product generation array 410. These partial products are compressed into two products (a sum and a carry vector) which are added together by portions of circuit 340 to produce a 64-bit result, AxB, in the result register 415. In this fashion, the entire multiplier 314 can produce four 64-bit results in parallel based on four pairs of 32-bit operands from Vs and Vt. In this fashion, multiplier 314(1) can perform a wide data format multiplication (32× 32) in two clock cycles.

FIG. 6B illustrates a diagram of multiplier portion 314(1) when partitioned to perform 16-bit multiplication. In this case, only half of the partial product generation circuitry is consumed as sections 424 and section 422 of partial product generation array 410 are used. The other two sections are zeroed. Two 16-bit operands, c and d, are stored in register portion 310' of register Vs and two 16-bit operands, a and b, are stored in register portion 312' of register Vt. Circuit 314(1) generates an array of 17 partial products as shown in array 410. These partial products are compressed into two products (a sum and a carry vector) which are added together by portions of circuit 340 to produce a two 32-bit results, cxa and dxb, in the result register 415. In this fashion, the entire multiplier 314 can produce eight 32-bit results in parallel based on eight pairs of 16-bit operands from Vs and Vt.

FIG. 6C illustrates a diagram of multiplier portion 314(1) when partitioned to perform byte (8-bit) multiplication. In this case, only one quarter of the partial product generation circuitry is consumed as sections 432, 434, 436 and 438 are used. The other six sections are zeroed. Four 8-bit operands, A, B, C and D are stored in register portion 310' of register Vs and four 8-bit operands, E, F, G and H, are stored in register portion 312' of register Vt. Circuit 314(1) generates an array of 17 partial products as shown in array 410. These partial products are compressed into two products (a sum and a carry vector) which are added together by portions of circuit 340 to produce a four 16-bit results, A×E, B×F, C×G and D×H, in the result register 415. In this fashion, the entire multiplier 314 can produce 16 16-bit results in parallel based on 16 pairs of 8-bit operands from Vs and Vt.

Clock Gating and Power Savings

Table I below is an exemplary instruction opcode listing of the instructions supported by the data path circuit 300 of the present invention.

TABLE I

| Instruction Opcode | |
| --- | --- |
| Opcode(b) | Inst. |
| 000000 | ADD |
| 000001 | SUB |
| 000010 | ADDI |
| 000011 | CLT |
| 000100 | AVG |
| 000101 | CEQ |
| 000111 | CGT |
| 001011 | SMAX |
| 001101 | SMIN |
| 100000 | MULL |
| 100001 | MULH |
| 100010 | MULD |
| 100011 | MADD |
| 001111 | SABD |
| 010000 | SET |
| 010001 | MIXH |
| 010010 | MIXL |
| 010011 | SHR |
| 010101 | SHPR |
| 010100 | SHL |
| 010110 | SHPL |
| 010111 | PACK |
| 011000 | UPKL |
| 011001 | UPKL |
| 011010 | PACKD |
| 000100 | MAND |
| 000110 | MNAND |
| 001000 | MOR |
| 001010 | MNOR |
| 001100 | MXOR |

As seen from the opcode listing, each multiply instruction has its most significant bit (msb) set high, "1," and all other instructions have their msb set low, "0." The execution of the multiplier circuit 314 is directly controlled by the most significant bit (without using any gate) of the opcode. Whenever this bit is '1,' multiplication is performed by the multiplier unit 314 of data path circuit 300.

The multiplier 314 consumes a relatively large amount of power compared to the remainder of the data path 300. In CMOS circuits, the power is consumed only during switching from high to low or low to high. Therefore, in order to reduce multiplier power, a technique called gated clocking is used to perform operand isolation. In this technique, the data in the input register is changed/stored only when a multiply operation is required. By preventing the input register from latching new data when no multiplication instructions are being processed, the input for the multiplier remains constant thereby resulting in less switching and low power consumption within multiplier circuit 314. In order to perform gated clock operation, the MSB of the opcode is used to trigger the clock input for the multiplier input register.

Figure 7:
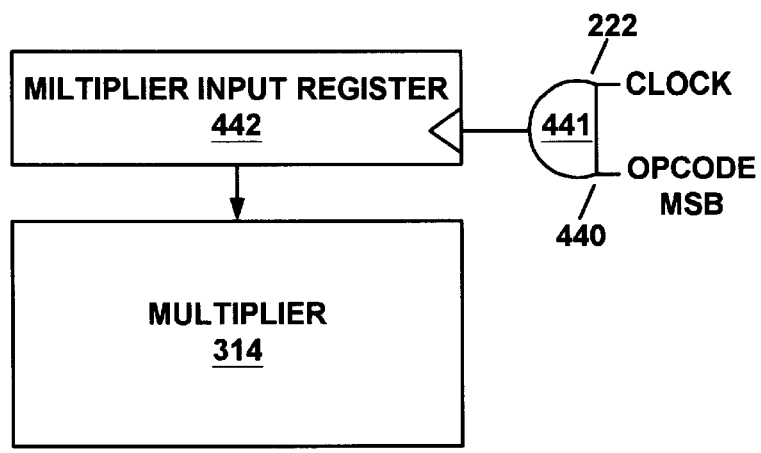
FIG. 7 is a block diagram of clock gated multiplier circuitry of the present invention that is placed in a low power state when multiplier instructions are not being processed by the data path architecture of the present invention.

FIG. 7 illustrates a circuit configuration used by an embodiment of the present invention for power savings in view of the above instruction opcode format. This embodiment utilizes clock gating of the input latch in combination with specially designed opcode values for performing power savings. The circuitry of FIG. 7 saves power by disabling the multiplier circuits 314 when non-multiply instructions are being processed by the data path circuit 300. By disabling the multiplier circuitry 314 in these conditions, power is saved. The msb of the currently processed opcode is fed over line 440 to one input of AND gate 441. The other input of AND gate 441 is the system clock 222. The output of AND gate 441 is then fed to the latch input of both input registers 442 to multiplier circuit 314. In one embodiment, the input registers are register 310 and register 312 (FIG. 4). When the msb of the opcode is low (logical 0), this clock gates the clock signal fed to the input registers 442 thereby preventing the registers from latching new data. Power is reduced because the multiplier circuit 314 is then presented with the same input data thereby preventing many of the internal signals from transitioning and consuming power. When the msb signal over line 440 is high, the input registers 442 are free to latch in new data.

Universal Adder-Subtractor Circuit

The following discussion is directed at the universal reconfigurable adder subtractor (URAS) unit of the pipelined logic circuit 305 of the data path 300 of the present invention. The URAS circuit 320 offers hardware reusability with a delay proportional to O(logn). The URAS circuit 320 performs add, subtract, average, minimum, maximum and compare operations along with the generation of carry-out (Cout), overflow (UF), sign (S), equal-to (EQ), greater-than (GT), and less-than (LT) conditions with or before the result. The add and subtract operations support saturated arithmetic which is a requirement for multimedia processing. The URAS circuit 320 is reconfigurable; it can calculate all the results and conditions (mentioned above) for one 64-bit, two 32-bit, four 16-bit, or eight 8-bit signed unsigned operands. In order to achieve high speed, with reconfigurability and minimum area, techniques are developed for partitioning the unit into independent blocks of 8, 16, 32 and 64-bits. In one embodiment, the URAS circuit is designed for the VLIW or Media processors, which require high degree of reconfigurability and high speed operation.

In order to achieve high speed with reconfigurability and minimum area, techniques are developed for partitioning the adder-subtractor and calculating the conditions (before the results are available) without producing any significant delay and area penalty. The URAS circuit 320, in one embodiment, is designed for VLIW or Media processors, which require high degree of reconfigurability, and high speed operation.

Figure 8:
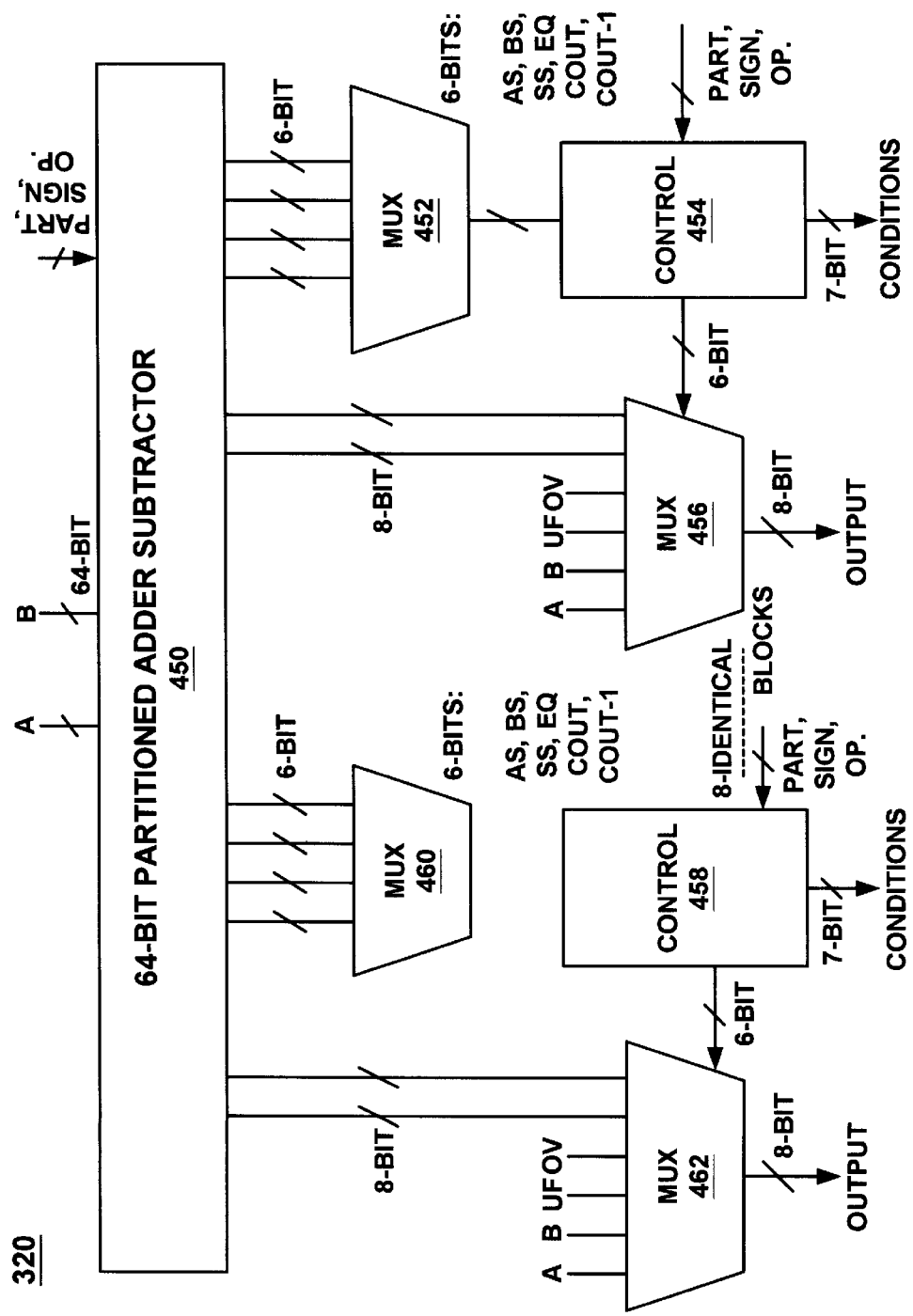
FIG. 8 is a block diagram of a universal reconfigurable adder-subtractor circuit (URAS) used in the data path architecture of one embodiment of the present invention.

FIG. 8 shows the block diagram of the URAS circuit 320 which includes a 64-bit reconfigurable adder-subtractor circuit 450 and the control logic 454,458 for controlling the operation of the unit. The reconfigurability of the unit is achieved using six control signals. The control signals Part0, Part1 are used to partition the logic into 64, 32, 16, or 8-bit independent units and Table II shows the partition of the unit for different partition signals. The Sign control signal is used to control the sigri/unsign operation. The rest of the control signals are used to control the operation of the unit.

TABLE II

| Part1 | Part0 | Operation |
|-------|-------|-----------|
| 0 | 0 | Byte |
| 0 | 1 | Half-word (16-bit) |
| 1 | 0 | Word (32-bit) |
| 1 | 1 | Double word (64-bit) |

The adder-subtractor 450 can be configured as an adder to support add, and average operations, and as a subtractor to support subtract, compare, maximum and minimum operations. During add or subtract operations, if the results are not in the required range then saturation is performed. In average operations, the result of the add operation is shifted right one bit, during this operation the least significant bit is discarded and the carry out becomes the most significant bit of the result. In compare, the two input operands are subtracted to calculate the sign (S), equal-to (EQ), greater-than (GT), and less-than (LT) conditions. In minimum and maximum operations, the two operands are subtracted and based on the conditions, e.g., sign (S), equal-to (EQ), greater-than (GT), and less-than (LT), minimum or maximum of the two operands are selected.

Table III shows the operation of the URAS circuit 320 for different control inputs. The least significant bit is used to control the add-subtract operation, when this bit is '0' then the unit performs add operation (for addition and average) and when this bit is '1' then subtract operation is performed, e.g., for sub, max, min, and compare operations.

TABLE III

| Control | Operation |
|---------|-----------|
| 000 | Add |
| 001 | Subtract |
| 010 | Average |
| 011 | Max |
| 101 | Min |
| 111 | Compare |

The control logic 454, 458 is used to generate the carry-out (Cout), overflow (OV), underflow (UF), sign (S), equal-to (EQ), greater-than (GT), and less-than (LT) conditions for each 8-bit block and is used to control the output of the whole unit. The carry out signals are generated by re-using the fast carry generation blocks of the adder-subtractor unit 450.

Figure 9:
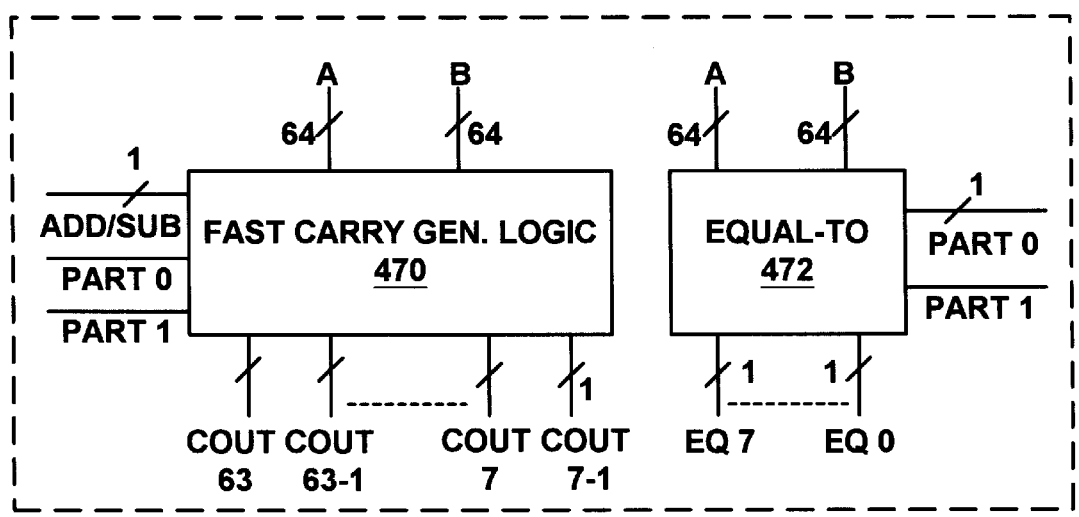
FIG. 9 illustrates fast carry generate logic and equal-to logic of a 16-bit block of carry generate logic for the URAS circuit of FIG. 8.
Figure 10:
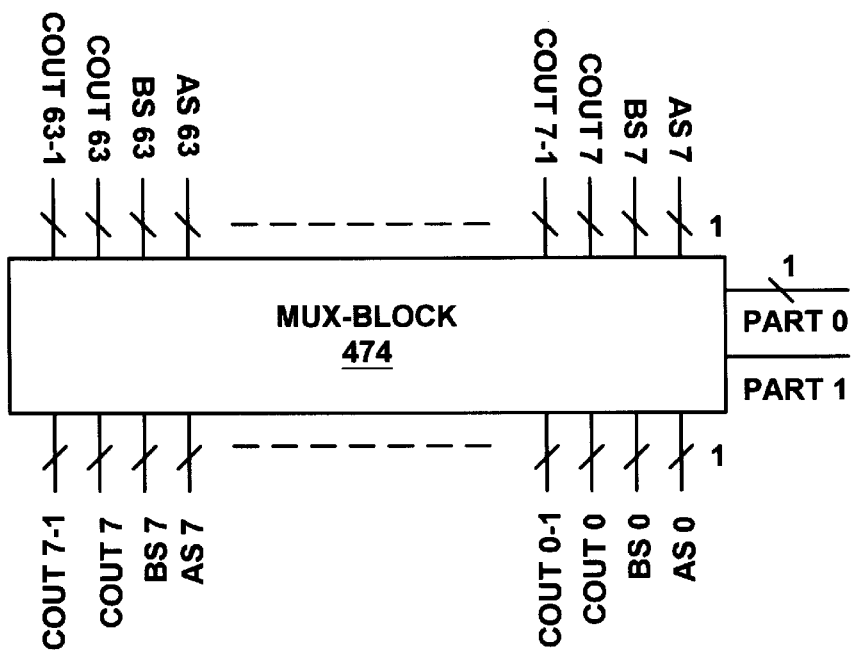
FIG. 10 illustrates a multiplexer block of a 16-bit block of carry generate logic for the URAS circuit of FIG. 8.
Figure 11:
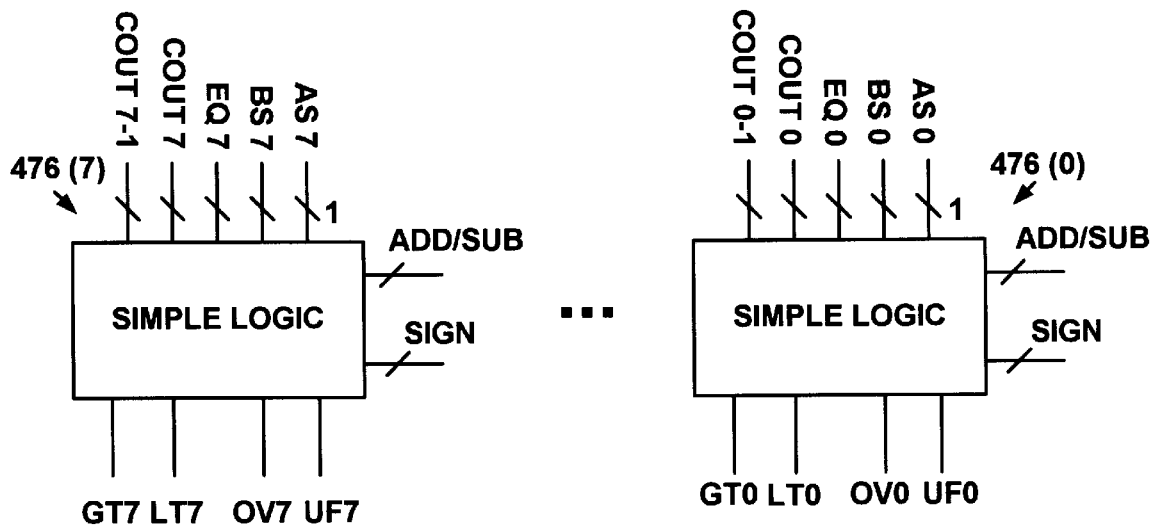
FIG. 11 illustrates block diagrams representing identical blocks generating equal-to, greater-than, less-than, overflow, underflow, and carry-out conditions for each stage in a 16-bit block of carry generate logic for the URAS circuit of FIG. 8.

FIG. 9, FIG. 10 and FIG. 11 illustrate a 16-bit block of the carry generation logic used by the adder-subtractor circuit 450 of the URAS circuit 320.

Figure 12:
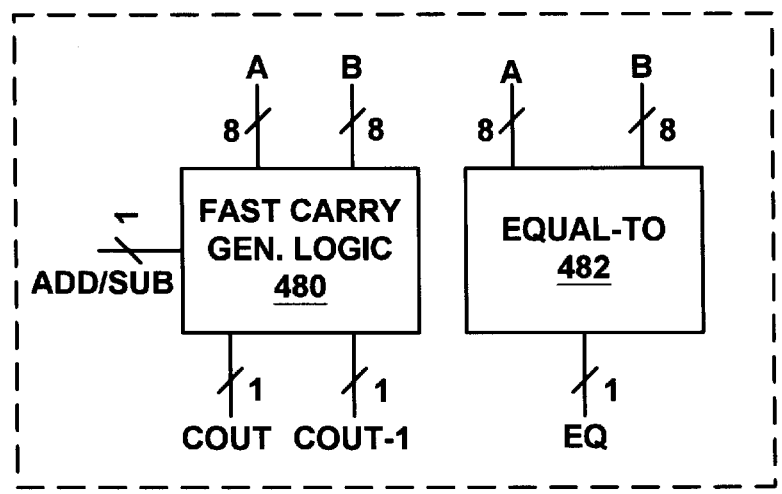
FIG. 12 and FIG. 13 illustrate the block diagram of the 8-bit basic condition resolution logic of the URAS circuit without any partition.
Figure 13:
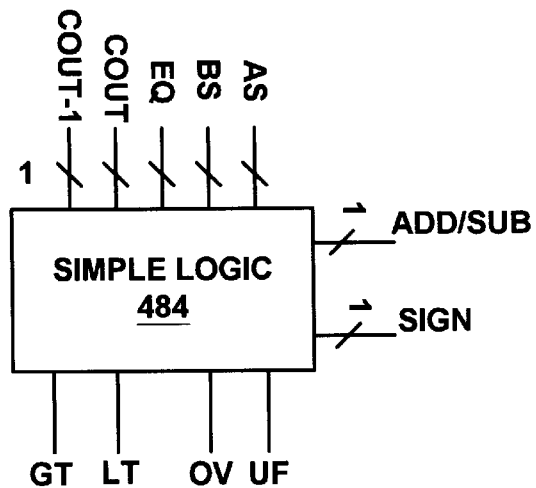

FIG. 12 and FIG. 13 illustrate a block diagram of the 8-bit basic condition resolution logic of the URAS circuit 320. The condition resolution logic works in parallel with the arithmetic unit and calculates the equal to (EQ), greater-than (GT), less-than (LT), overflow (OV), underflow (UF), carry-out (Cout) conditions with or before the result. The condition resolution logic is reconfigurable and can calculate all the results (mentioned above) for one 64-bit, two 32-bit, four 16-bit, or eight 8-bit signed and unsigned operands. The reconfigurability of the unit is achieved using only four control signals. Two of the control signals (Part0, Part1) are used to partition the logic into 64, 32, 16, or 8-bit independent units as shown in Table II and the Sign control signal is used to control the signed/unsigned operation. The operation control signal specifies and controls the add, subtract, average, min, and max operation.

In this section, the design of the basic condition resolution logic of FIG. 12 and FIG. 13 is presented without any partition. The required interfacing is described in order to obtain the 64-bit partitioned condition resolution circuit. Specifically, let $A=(a_{n-1}, \ldots a0)$, and $B=(b_{n-1}, \ldots, b0)$ be the two inputs, with $a_{n-1}$ and $b_{n-1}$ being the sign bits. The conditions that need to be tested are equal-to (EQ), greater-than (GT), less-than (LT), overflow (OV), underflow (UF) and carry-out (Cout). The EQ, GT and LT conditions are calculated by subtracting B from A, and looking at the carry-out, sign bit of A and B, and EQ (A=B) condition (see Table IV).

TABLE IV

GT (Max), LT (Min) and Equal to Condition Resolution using A–B operation. As, Bs, are the MSB of the inputs A and B, and $C_{out}$ is the carry generated in A–B

| Operation: Data Type | A < B | A > B | A = B |
|---|---|---|---|
| Unsign | $C_{out} = 0$ | $C_{out} = 1$ And A! = B | A XNOR B |
| As = 0, Bs = 0 | $C_{out} = 0$ | $C_{out} = 1$ And A! = B | A XNOR B |
| Sign | $C_{out} = 0$ | $C_{out} = 1$ And A! = B | A XNOR B |
| As = 1, Bs = 1 | | | |
| As = 1, Bs = 0 | $C_{out} = 1$ | | A XNOR B |
| As = 0, Bs = 1 | | $C_{out} = 0$ | A XNOR B |

The UF, OV and Cout conditions are calculated using the Sign bits of A & B, Cout, Cout-1 produced during the add or subtract operation. The calculation of these conditions are performed according Table V and Table VI for add and subtract operations, respectively.

TABLE V

Saturation Condition Resolution for Add operation:

| Data Type | Operation | Overflow | Underflow |
|---|---|---|---|
| Unsign | A + B | $C_{out} = 1$ | |
| As = 0, Bs = 0 | A + B | $C_{out}$ XOR $C_{out-1}$ | |
| Sign | A + B | | $C_{out}$ XOR $C_{out-1}$ |
| As = 1, Bs = 1 | | | |
| As = 1, Bs = 1 | A + B | | |
| As = 1, Bs = 1 | A + B | | |

TABLE VI

Saturation Condition Resolution for Subtract operation:

| Data Type | Operation | Overflow | Underflow |
|---|---|---|---|
| Unsign | A – B | | $C_{out} = 0$ (A < B) |
| As = 0, Bs = 0 | A – B | | |
| Sign | A – B | | |
| As = 1, Bs = 1 | | | |
| As = 1, Bs = 1 | A – B | | $C_{out}$ XOR $C_{out-1}$ |
| As = 1, Bs = 1 | A – B | $C_{out}$ XOR $C_{out-1}$ | |

The main blocks of FIG. 12 and FIG. 13 are the carry generation 480 and equal-to condition resolution 482. These blocks generate the Cout (and Cout-1), and EQ signals respectively. The Cout, Cout-1, EQ, Add/Sub, and Sign signals are used to generate the GT, LT, OV, and UF conditions, and the control signals for selecting the proper output result.

To get the higher order condition resolution circuit with reconfigurability for different data types, reconfigurable Carry generation and EQ condition resolution circuits are designed and integrated to get the high order circuits. In order to produce eight independent sets of OV, UF, EQ, GT, LT, and Cout for 64-bit inputs, the carry generation 480, and equal_to blocks 482 are cascaded according to FIG. 11 which illustrates eight cascaded blocks 476(7)–476(0). The partition of all the blocks is performed using Part0 and Part1 control signals (Table II) and the add-subtract operation of the adder subtractor 450 is controlled by the LSB operation control bit and signed/unsigned operands are specified by the Sign signal.

FIG. 10 illustrates the MUX block 474. The MUX block 474 is used in order to produce the correct carries and sign of the input operands for different data types. This MUX block 474 produces the sign and carry for each 8-bit group and the function of this MUX block 474 is controlled by Part0 and Part1. The output of MUX block for different data types is shown in Table VII.

Oklobdzija and Farooqui. The carry generation block is also reused in the adder-subtractor unit 450 for the generation of sum and difference respectively. In the following sections the design of these blocks is described. The carry generation block is discussed in the adder-subtractor design 450.

In this section, the design of the reconfigurable equal-to detector is described. This circuit can detect result equal zero for 64, 32, 16, or 8-bit independent operands for add and subtract operations. The equal-to logic is obtained by XOR of the two inputs (A and B) and then ANDing the XOR output using an n-input AND gate (obtained using a tree of 2-input AND gate). The 64-bit zero detect logic is obtained by cascading the 8-bit blocks with controls for partitioning. The input to the 64-bit partitioned equal-to detector are two 64-bit vectors A and B, partition control signal part0, part1 and the outputs are EQ0 . . . EQ7. The partition of the logic

TABLE VII

The Cout and Sign of the Mux-block for different data types:

| Data Type | Cout7 | Cout6 | Cout5 | Cout4 | Cout3 | Cout2 | Cout1 | Cout0 |
|---|---|---|---|---|---|---|---|---|
| Byte | Cout63–56 | Cout55–48 | Cout47–40 | Cout39–32 | Cout31–24 | Cout23–16 | Cout15–8 | Cout7–0 |
| Half-word (16-bit) | Cout63–48 | Cout63–48 | Cout47–32 | Cout47–32 | Cout31–16 | Cout31–16 | Cout15–0 | Cout15–0 |
| Word (32-bit) | Cout63–32 | Cout63–32 | Cout63–32 | Cout63–52 | Cout31–0 | Cout31–0 | Cout31–0 | Cout31–0 |
| Double word (64-bit) | Cout63–0 | Cout63–0 | Cout63–0 | Cout63–0 | Cout63–0 | Cout63–0 | Cout63–0 | Cout63–0 |

| Data Type | As7 | As6 | As5 | As4 | As3 | As2 | As1 | As0 |
|---|---|---|---|---|---|---|---|---|
| Byte | A63 | A55 | A47 | A39 | A31 | A23 | A15 | A7 |
| Half-word | A63 | A63 | A47 | A47 | A31 | A31 | A15 | 1A15 |
| Word (32-bit) | A63 | A63 | A63 | A63 | A31 | A31 | A31 | A31 |
| Double word (64-bit) | A63 | A63 | A63 | A63 | A63 | A63 | A63 | A63 |

The output of the MUX block 474, equal_to, and result_equal_zero are passed to eight independent logic blocks as shown in FIG. 11 to generate the OV, UF, GT, LT conditions and to generate the control signals for selecting the proper output result. The schematic diagram of the logic block to generate the OV, UF, GT, and LT conditions is analogous to the carry generation logic described in co-pending United States Patent Application entitled "A Multiplexer-Based Parallel N-Bit Adder Circuit for High Speed Processing," filed on Mar. 23, 1999, Ser. No. 09/275,068, by Chehrazi, is performed according to Table V. The equal-to logic produces 8-independent outputs and they represent different values for different data types (see Table VIII). In case of byte operation, all the outputs are different, while in case of half-word operation EQ7 and EQ6; EQ5 and EQ4, EQ3 and EQ2, EQ1 and EQ0 are same. In case of word operations, EQ7, EQ6, EQ5, and EQ4; EQ3, EQ2, EQ1, and EQ0 are all same. In case of double word operations, all the outputs are same.

TABLE VIII

The outputs of the Eq_ to logic for different data types. Note: a is the 64-bit input operand:

| Data Type | EQ7 | EQ6 | EQ5 | EQ4 | EQ3 | EQ2 | EQ1 | EQ0 |
|---|---|---|---|---|---|---|---|---|
| Byte | a63–56 | a55–48 | a47–40 | a39–32 | a31–24 | a16–23 | a15–8 | a0–7 |
| Half-word (16-bit) | a63–48 | a63–48 | a47–32 | a47–32 | a31–16 | a31–16 | a15–0 | a15–0 |
| Word | a63– | a63– | a63– | a63– | a31–0 | a31–0 | a31–0 | a31–0 |

TABLE VIII-continued

The outputs of the Eq__ to logic for different data types. Note: a is the 64-bit input operand:

| Data Type | EQ7 | EQ6 | EQ5 | EQ4 | EQ3 | EQ2 | EQ1 | EQ0 |
|---|---|---|---|---|---|---|---|---|
| (32-bit) | 32 | 32 | 32 | 32 | | | | |
| Dble word (64 bit) | a63–0 | a63–0 | a63–0 | a63–0 | a63–0 | a63–0 | a63–0 | a63–0 |

In this section the design of a fast 64-bit adder-subtractor is presented. This adder-subtractor 450 is designed using only multiplexers and 2 input inverted logic gates. The proposed circuit is reconfigurable it can generate the addition or subtraction of two double word, four word, eight half-word, or sixteen byte signed unsigned operands. The carries are generated in groups of four bits using a fast carry generate logic. The final sum-difference is calculated using the carry select method. The carry select adder works in parallel with the carry generation, and calculates the two sums based on Cin=0, and Cin=1 for 4-bit groups. When the actual carry for that group becomes available via fast carry generation, the correct sum is selected. Due to its structured design and generation of carries in groups of four bits, the adder-subtractor unit is well suited for multi-media applications as a partitioned adder-subtractor. Since pass transistors based multiplexers are the fastest circuit elements in the standard CMOS logic, the circuit uses multiplexers and 2-input logic gates.

The carry generate logic has been implemented using four-bit groups making the adder delay proportional to O(log n). Pass-transistor multiplexers, have been used in the generation of carry and sum. The critical path of the 64-bit partitioned adder-subtractor is equivalent to 7 two-to-one multiplexers and 2 XOR gates (including the delay of the partitioning logic). Due to its structured design and generation of carries in groups of four (see copending application Ser. No. 09/275,068 which also describes the analogous partitioning control for this universal adder-subtractor circuit), the design fits well for multi-media applications.

Following describes the mathematical analysis based on Brent's 'o' operator for the four bit carry generation. Let, A=an-1, an-2 . . . a1, a0, and B=bn-1, bn-2 . . . b1, b0 be the two input operands, with an-1 and bn-1 be the most significant bits. The generate and propagate signal at bit position "i" are given by; $gi=ai.bi$, and $pi=ai \wedge bi$, (where:.=AND operation and ^=XOR operation). The Carry out from bit position "i" is given by; $C_i=g_i.p_i$ (where +=OR operation) provided CO=0. The "o" operator is given as follows:

$$(g,p)o(g',p')=(g+(p.g'),p.p') \quad (1)$$

The group Generate (G) and Propagate (P) are given by:

$$(G_i,P_i)=(g_0,p_0) \text{ if } i=0 \ \& \ (g_i,p_i)o(g_{i-1},p_{i-1}) \text{ if } 0<i<n \quad (2)$$

Using (1), the generate and propagate signals for each level (k) of the adder are generated using the following combination:

$$(G_{i+2^k},P_{i+2^k})=(g_{i+2^k},p_{i+2^k})o(g_i,p_i) \text{ for } 0<k<\log n \quad (3)$$

In the proposed implementation for 'n' bits, at k=0 (first level) n/2 generate and propagate signals are produced using the following combination:

$$(G_{2i+1},P_{2i+1})=(g_{2i+1})o(g_{2i},p_{2i}) \text{ for } 0<i<n/2 \quad (4)$$

At the second level n/4 signals are produced (by grouping the signals generated at the first level) using (4) but limiting i to n/4. These signals are the four-bit group generate and propagate signals, their value for 4-bit case is given below:

$$(g_{10},p_{10})=(g_1,p_1)o(g_0,p_0) \text{ and}$$

$$(g_{32},p_{32})=(g_3,p_3)o(g_2,p_2) \text{ at k=0 (at first level)} \quad (5)$$

$$(g_{30},p_{30})=(g_{32},p_{32})o(g_{10},p_{10}) \text{ (at second level)} \quad (6)$$

In this realization no $(g_2, p_2)$ or intermediate even carry is generated, because these are generated within the conditional sum adders. Once the 4-bit group carries are available, the carries in multiplies of 4 are generated using (2). This technique results in minimum wiring and area, for n bits, approximately $2n/_2k$ signals are generated at each level of the adder.

The 64-bit carry generate logic is based on the analysis presented above. FIG. 9, FIG. 10 and FIG. 11 illustrate the 16-bit block of this carry generate logic. The partition of the carry generate logic is performed according to Table III. In order to get the highest speed using static CMOS standard cells, the design, in one implementation, is restricted to 2-input NAND, NOR, XNOR, and two-to-one multiplexers. The reason for using these gates is that the delay of NAND, NOR gates in static CMOS is less than that of the non-inverting gates (AND, OR etc.), and in current technology multiplexers are realized using transmission gates, and inverters which offer the delay comparable to a single gate.

The four bit generate and propagate logic is described in copending U.S. patent application Ser. No. 09/275,068. The circuit operation is as follows, g01=a1, if a1^b1=0; and g01=a0.b0 if a0^b0=1, taking advantage of the property that g1=1 and p1=1 can never occur. Once the two bit generate and propagate signals are computed, the 4-bit (and higher) group generate and propagate signals are calculated using one level of a two-one multiplexer and NAND/NOR gate respectively.

Data Path Instructions

Based on the hardware design of the data path 300, in one embodiment, the instructions (instruction opcode as well) are divided into four groups. The opcode for these instructions are designed in such a way that offers minimum decoding (delay) for instructions execution. The four groups are: 1) Add-Subtract; 2) Multiply; 3) Shift and Pack; and 4) Logical.

The Add-Subtract instructions are executed in the universal adder subtractor (URAS) block 320. The instructions 510 that fall within this first group and that are executed by the adder-subtractor block 320 of the pipelined logic unit 305 are shown in FIG. 14. The opcode for these instructions are designed in such a way that offers minimum decoding for this type of instructions. Whenever the first two bits of the instruction opcode are zero, then this group of Add-Subtract instructions are executed.

Moreover, in order to further speed up the instruction execution, the opcode bit zero is used as the carry-in and subtract control for the URAS unit 320. In this opcode assignment, all the instructions that needs subtraction (SUB, CLT, CEO, CGT, SMAX, SMIN) have their bit equal one and in case of addition (ADD, ADDI, AVG) this bit is zero. Therefore, when bit zero of the opcode is '1' a carry-in equal '1' for 2's complement subtraction is generated and adder is configured for subtraction without using any extra control signal.

With respect to multiply instructions, all Multiply instructions are executed by the 32-bit multiplier unit 314 in combination with the carry propagate adder circuit 340. The instructions 515 that are executed by the multiplier block 314 in combination with the carry propagate adder circuit 340 are shown in FIG. 15. All multiplication instructions complete within two execution pipestages.

FIG. 18A illustrates an exemplary format 530 of the multiply add instruction called the MADD instruction. The multiply add operation multiplies two corresponding operands from the operand registers, Vt and Vs, under control of the format field and adds the products of the adjacent operands together. The result is stored in the register, Vd. The multiplication can be signed or unsigned with or without saturation. The MADD instruction 530 specifies the source or input registers Vt and Vs by fields 530d and 530c, respectively, and specifies the destination register, Vd, in field 530b. Two forms of the MADD instruction are possible, MADD.HW (half word) and MADD.W (word) specify data widths. The MADD instruction executes within two execution pipestages and the data is written back in the writeback pipestage.

FIG. 18B illustrates an exemplary operation of the MADD instruction with respect to two exemplary input operands 310 and 312. The 128-bit register 310 is made up of eight 16-bit segments 310(a)–310(h). The 128-bit register 312 is made up of eight 16-bit segments 312(a)–312(h). Segment 310(h) contains value "D" and segment 310(g) contains value "A." Segment 312(h) contains value "C" and segment 312(g) contains value "B." The multiplier 314 is used to generate the products A×B and C×D. The adder circuit 340 then produces the result A×B+C×D in the result register 415 as shown in FIG. 18B.

FIG. 19 illustrates the operation of another type of multiply add instruction where the segment 310(h) contains a value of "1." The result is A×B+C as stored in the result register 415.

The Shift and Pack instructions are executed in the Shifter block 330 of the pipelined logic unit 305 of the data path circuit 300. The instructions 520 that are executed by the shifter block 330 are shown in FIG. 16. The opcode for these instructions are designed in such a way to require minimum decoding for this instruction type. Whenever the first two bits of the instruction opcode are zero and one then Shift Pack type of instructions are executed. This can be detected by an inverter and an AND gate, offering minimum delay in instruction execution. Moreover, in order to further speed up the instruction execution, the opcode bit zero is used to differentiate between high and low inputs in MIXH and MIXL instructions. Similarly, in case of a shift operation this bit is used to perform Shift left (0) and Shift right (1). When bit zero of the opcode is '1' then MIXH, SHL, and SHPL are performed, and when this bit is '0' then MIXL, SHR, and SHPR are executed.

The Logic instructions are executed in the logic block 328 of the data path circuit 300. The instructions 525 executed by the this block are shown in FIG. 17. Since these instructions require minimum delay (not on the critical path) therefore we have used three bits of the opcode to generate the execute control signal for these instructions.

In Pack instructions, a 32-bit input operand is converted into 16-bit output to save the space in memory. The 32-bit input could be signed or unsigned. In case of signed operands it could be positive or negative. In pack operations, if the input value is larger than the 16-bit range then saturation is performed. In case of positive numbers Saturation to a maximum value is performed and in case of negative numbers Saturation to a minimum value is performed. The detection of the range for positive and negative numbers is performed according to the following rules:

```
Unsigned 32-bit input:
If OR (A31–A16) = 1, then
    Output = FFFFhex (saturate to MAX value)
else
    Output = A15–A0
(Where A31 is the most significant bit and A0 is the
least significant bit)
Signed 32-bit input:
If A31 = 0, then
    if OR (A30–A15) = 1 then
        output = 7FFFhex (saturate to MAX +ve value)
    else
        output = 0, A14–A0 (0 = GND)
else
    if NAND (A30–A15) = 1 then
        output = 1000hex (saturate to MIN-ve value)
    else
        output = 1, A14–A0 (1 = VDD)
```

During the Unpack operation if the 16-bit input number is signed then Sign extension of the output result to 32-bit (A31-A16) is performed by ANDing the Sign bit with A15., else A31-A16 is set to 0000hex in one embodiment.

Figure 20A:
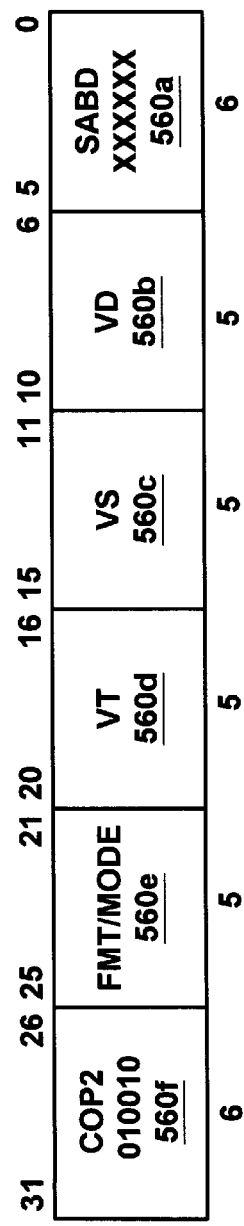
FIG. 20A illustrates the instruction format for the sum of absolute differences (SABD) instruction in accordance with an embodiment of the present invention.
Figure 20B:
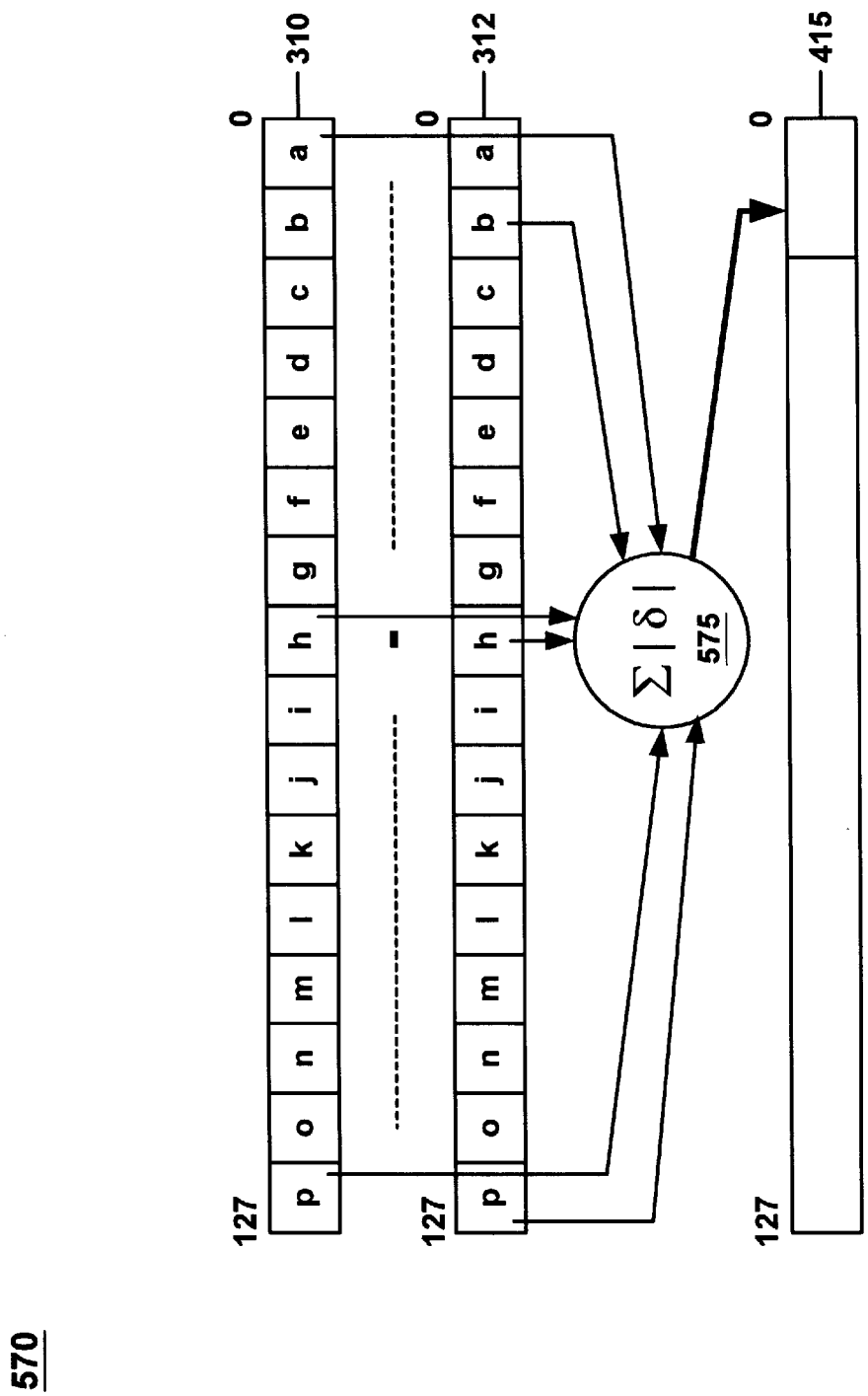
FIG. 20B is a diagram of the operation of the SABD instruction in accordance with an embodiment of the present invention.

FIG. 20A and FIG. 20B illustrate the operation of the sum of absolute differences instruction called the SABD instruction. The SABD instruction of the present invention executes within two execution pipestages and the data is written back in the writeback pipestage. FIG. 20A illustrates an exemplary format 560 of the SABD instruction. The SABD operation computes the differences between corresponding operands stored in the operand registers, Vt and Vs, under control of the format field, determines the absolute value of these differences then adds the absolute value differences together to arrive at a final sum. The resultant sum value is stored in the least significant half word of the destination register, Vd. The operands can be signed or unsigned packed bytes as specified by the formal field 560e. The SABD instruction 560 specifies the source or input registers Vt and Vs by fields 560d and 560c, respectively, and specifies the destination register, Vd, in field 560b. Different modes of operation are possible of the SABD instruction and these are specified in the mode field 560e.

FIG. 20B is a diagram 570 that illustrates the operation of the SABD instruction in one exemplary mode. Input register 310 contains 16 separate 8-bit operands called 310(a)–310(p). Input register 312 contains 16 separate 8-bit operands called 312(a)–312(p). As shown in FIG. 20B, each separate operand of register 310 has a corresponding operand of register 312, e.g., operand 310(f) corresponds to operand 312(f), etc. The data path circuit 300 first uses one of its 16 8-bit subtractor circuits, 322 or 324 (FIG. 4), to perform subtraction on each corresponding operand pair, specifically subtracting Vs from Vt. The other 16 8-bit subtractor circuit then performs the same subtraction in parallel but between Vt from Vs. This simultaneously products 32 separate differences and a positive and a negative difference for each corresponding operand pair. Multiplexers in circuit 332 then select the positive difference for each operand pair as the absolute value difference for each pair. These absolute value differences are them summed together at 575 of FIG. 20B to arrive at a single result sum stored in register 415.

The preferred embodiment of the present invention, a high performance data path architecture for a multimedia processor, is thus described. While the present invention has been described in particular embodiments, it should be appreciated that the present invention should not be construed as limited by such embodiments, but rather construed according to the below claims.

What is claimed is:

1. A pipelined data path circuit comprising:
   a pipelined partitioned multiplier circuit receiving a multiply instruction designating first and second operands and for generating, with two clock cycle latency, a result based on said first and second operands, said pipelined partitioned multiplier circuit operable in a first mode to perform four simultaneous 32×32 bit multiplications generating four 64-bit results, operable in a second mode to perform eight simultaneous 16×16 bit multiplications generating eight 32-bit results and operable in a third mode to perform sixteen simultaneous 8×8 bit multiplication operations generating sixteen 16-bit results; and
   pipelined logic circuitry to execute a sum of absolute differences instruction which designates a first and a second operand, wherein said pipelined logic circuitry computes a result sum with two clock cycle latency and wherein said sum of absolute differences instruction and said multiply instruction are executed with one clock cycle throughput due to pipelining.

2. A pipelined data path circuit as described in claim 1 wherein said first operand is 128-bits wide and wherein said second operand is 128-bits wide.

3. A pipelined data path circuit as described in claim 2 wherein said pipelined partitioned multiplier circuit comprises four partitioned 32×32 bit multipliers each producing a separate 64-bit result.

4. A pipelined data path circuit as described in claim 1 wherein said pipelined logic circuitry comprises:
   a first subtractor circuit adapted to generate first differences between said first operand and said second operand;
   a second subtractor circuit adapted to generate second differences between said second operand and said first operand;
   a multiplexer adapted to select positive values between said first and second differences to produce absolute differences; and
   a partitioned carry propagate adder, of said pipelined partitioned multiplier circuit, for summing said absolute differences to produce a sum result.

5. A pipelined data path circuit as described in claim 4 wherein said partitioned carry propagate adder comprises four 64-bit carry propagate adder circuits.

6. A pipelined data path circuit as described in claim 1 further comprising:
   first and second operand registers clocked by a clock signal and for storing said first and second operands;
   an instruction detector circuit operable to detect a multiply instruction; and
   a clock gating circuit coupled to said instruction detector circuit and operable to disable said pipelined partitioned multiply circuit by gating said clock signal of said first and second operand registers provided said instruction detector circuit does not detect a multiply instruction.

7. A pipelined data path circuit comprising:
   first and second operand registers for storing first and second operands, respectively;
   a partitioned multiplier circuit coupled to said first operand register and said second operand register and adapted to generate, in a first execution pipestage, compressed first and second partial products which are stored in first and second pipeline registers, respectively;
   a logic circuit coupled to said first operand register and said second, operand register and adapted to generate, in said first execution pipestage, absolute differences between said first operand and said second operand, said absolute differences stored in a third pipeline register;
   a partitioned carry propagate adder configured in a first mode to add said first and second compressed partial products in a second execution pipestage to produce a multiply result value stored in a result register, said partitioned carry propagate adder also configured in a second mode to sum said absolute differences in said second execution pipestage to produce a sum result value stored in said result register, wherein said result values are produced with two cycle latency and with single cycle throughput.

8. A pipelined data path circuit as described in claim 7 wherein said logic circuit comprises:
   a first subtractor circuit adapted to generate first differences between said first operand and said second operand;
   a second subtractor circuit adapted to generate second differences between said second operand and said first operand; and
   a multiplexer adapted to select positive values between said first and second differences to produce said absolute differences.

9. A pipelined data path circuit as described in claim 7 wherein said first and second operand registers are each 128-bits wide and wherein said partitioned multiplier circuit comprises four partitioned 32×32 bit multipliers and wherein said result register is 256-bits wide.

10. A pipelined data path circuit as described in claim 9 wherein said partitioned multiplier circuit and said partitioned carry propagate adder can be configured in a first mode to perform four simultaneous 32×32 bit multiplications, in a second mode to perform eight simultaneous 16×16 bit multiplications and in a third mode to perform sixteen simultaneous 8×8 bit multiplication operations.

11. A pipelined data path circuit as described in claim 7 wherein partitioned carry propagate adder comprises four 64-bit carry propagate adders and wherein said result register is 256-bits wide.

12. A pipelined data path circuit as described in claim 7 wherein said partitioned multiplier circuit is configured to generate a plurality of partial products based on said first and second operands and further comprises a compressor tree circuit operable to compress a plurality of partial products to generate said first and second compressed partial products.

13. A pipelined data path circuit as described in claim 7 wherein said first and said second operand registers are clocked by a clock signal and further comprising:
   an instruction detector circuit operable to detect a multiply instruction; and
   a clock gating circuit coupled to said instruction detector circuit and operable to disable said partitioned multiply circuit by gating said clock signal of said first and second operand registers provided said instruction detector circuit does not detect a multiply instruction.

14. A pipelined data path circuit comprising:
   first and second operand registers for storing first and second operands, respectively;
   a partitioned multiplier means coupled to said first operand register and said second operand register and for generating, in a first execution pipestage, compressed first and second partial products which are stored in first and second pipeline registers, respectively;
   a logic circuit means coupled to said first operand register and said second operand register and for generating, in said first execution pipestage, absolute differences between said first operand and said second operand, said absolute differences stored in a third pipeline register;
   a partitioned carry propagate adder means configured in a first mode for adding said first and second compressed partial products in a second execution pipestage to produce a multiply result value stored in a result register, said partitioned carry propagate adder means also configured in a second mode for summing said absolute differences in said second execution pipestage to produce a sum result value stored in said result register, wherein said result values are produced with two cycle latency and with single cycle throughput.

15. A pipelined data path circuit as described in claim 14 wherein said logic circuit means comprises:
   a first subtractor circuit means for generating first differences between said first operand and said second operand;
   a second subtractor circuit means for generating second differences between said second operand and said first operand; and
   a multiplexer means for selecting positive values between said first and second differences to produce said absolute differences.

16. A pipelined data path circuit as described in claim 14 wherein said first and second operand registers are each 128-bits wide and wherein said partitioned multiplier means comprises four partitioned 32×32 bit multipliers and wherein said result register is 256-bits wide.

17. A pipelined data path circuit as described in claim 16 wherein said partitioned multiplier means and said partitioned carry propagate adder means can be configured in a first mode to perform four simultaneous 32×32 bit multiplications, in a second mode to perform eight simultaneous 16×16 bit multiplications and in a third mode to perform sixteen simultaneous 8×8 bit multiplication operations.

18. A pipelined data path circuit as described in claim 14 wherein said partitioned carry propagate adder means comprises four 64-bit carry propagate adders and wherein said result register is 256-bits wide.

19. A pipelined data path circuit as described in claim 14 wherein said partitioned multiplier means is configured to generate a plurality of partial products based on said first and second operands and further comprises a compressor tree means for compressing said plurality of partial products to generate said first and second compressed partial products.

20. A pipelined data path circuit as described in claim 14 wherein said first and said second operand registers are clocked by a clock signal and further comprising:
   an instruction detector means operable to detect a multiply instruction; and
   a clock gating means coupled to said instruction detector means and for disabling said partitioned multiply means by gating said clock signal of said first and second operand registers provided said instruction detector means does not detect a multiply instruction.

* * * * *